(12) United States Patent
Collard et al.

(10) Patent No.: US 8,508,537 B2
(45) Date of Patent: Aug. 13, 2013

(54) SYSTEM AND METHOD FOR DEPENDENCY GRAPH EVALUATION FOR ANIMATION

(75) Inventors: Bryant E. Collard, Kaysville, UT (US); Bradley A. Edwards, South Jordan, UT (US); Antony K. Jones, South Jordan, UT (US); Adam T. Clayton, Centerville, UT (US); Tyler J. Colbert, Pleasant Grove, UT (US); Fraser H. Graham, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1045 days.

(21) Appl. No.: 12/272,648

(22) Filed: Nov. 17, 2008

(65) Prior Publication Data

US 2010/0123723 A1    May 20, 2010

(51) Int. Cl.
    *G06T 13/00*      (2011.01)
(52) U.S. Cl.
    USPC .......................................................... 345/474
(58) Field of Classification Search
    USPC .......................................................... 345/474
    See application file for complete search history.

(56) References Cited

U.S. PATENT DOCUMENTS

| | | | |
|---|---|---|---|
| 5,808,625 A | | 9/1998 | Picott et al. |
| 6,057,859 A * | | 5/2000 | Handelman et al. ........... 345/474 |
| 6,285,380 B1 * | | 9/2001 | Perlin et al. ................... 345/473 |
| 6,388,668 B1 * | | 5/2002 | Elliott .......................... 345/474 |
| 6,414,684 B1 * | | 7/2002 | Mochizuki et al. ............ 345/473 |
| 6,462,742 B1 * | | 10/2002 | Rose et al. ..................... 345/473 |
| 6,522,331 B1 | | 2/2003 | Danks |
| 6,535,215 B1 * | | 3/2003 | DeWitt et al. ................. 345/473 |
| 6,999,084 B2 * | | 2/2006 | Mochizuki et al. ............ 345/473 |
| 7,440,819 B2 * | | 10/2008 | Morel et al. ................... 700/245 |
| 7,511,718 B2 * | | 3/2009 | Subramanian et al. ........ 345/619 |
| 2006/0022983 A1 | | 2/2006 | Gauthier et al. |
| 2007/0115289 A1 * | | 5/2007 | Goldfarb ........................ 345/473 |

FOREIGN PATENT DOCUMENTS

| | | |
|---|---|---|
| EP | 1 589 486 A1 | 10/2005 |
| EP | 1 884 899 A2 | 2/2008 |
| EP | 1 918 880 A2 | 5/2008 |
| WO | WO 2008/064363 | 5/2008 |

OTHER PUBLICATIONS

Baran, et al., "Automatic Rigging and Animation of 3D Characters," Computer Science and Artificial Intelligence Laboratory, Massachusetts Institute of Technology. Published for appearance in the ACM SIGGRAPH 2007 conference proceedings (May 7, 2007).
van der Beek, J., "Dependency Graphs in Games," Gamasutra.com (Aug. 29, 2003), available at http://www.gamasutra.com/view/feature/2812/dependency_graphs_in_games.php.
Feiler, et al. *Propagator: A family of patterns*. In Technology of Object-Oriented Languages and Systems, 1997. TOOLS 23. Proceedings Santa Barbara, CA, USA Jul. 28-Aug. 1, 1997, Los Alamitos, CA, USA, IEEE Comput. Soc. US. XP010267565.
European Search Report mailed Mar. 15, 2010, from European Application No. 09175993.6 filed Nov. 13, 2009.

* cited by examiner

*Primary Examiner* — Edward Martello
(74) *Attorney, Agent, or Firm* — Pillsbury Winthrop Shaw Pittman LLP

(57) ABSTRACT

Aspects include systems, devices, and methods for evaluating a source dependency graph and animation curve with a game system. The dependency graph may be evaluated at an interactive rate during execution of a game. The animation curve may describe change in a state of a control element over time. Subnetworks of the dependency graph may be identified and evaluated using a plurality of processors.

36 Claims, 14 Drawing Sheets

SYSTEM AND METHOD FOR DEPENDENCY GRAPH EVALUATION FOR ANIMATION

BACKGROUND OF THE INVENTION

1. Field of the Invention

This application relates generally to animation of elements in a game system, and more specifically to dependency graph evaluation using the game system.

2. Description of the Related Art

Game systems provide interactive experiences for users of the game systems. The game systems can be used for entertainment purposes, educational purposes, or a combination of the two, among other purposes. For example, a game may guide a user on an adventurous quest, or the game may prompt the user to answer mathematics questions. A user may input commands to a game system, and view the results of those input commands on a display. These displayed results are often animated by the game system based on a variety of factors, including user input, characters present in the game, and interaction of the characters with each other or with a game environment or scenery. Thus, developers continue to seek improved methods and devices for animating elements present within the game.

SUMMARY OF EMBODIMENTS

One embodiment includes a game animation system. The game animation system includes a processor configured to execute a game; source animation curve data, where the source animation curve data describes change in a state of a control element over time; a description of a first dependency graph defining transforms for the source animation curve data; and an engine for evaluating the first dependency graph at an interactive rate during execution of the game.

Another embodiment includes a method of executing a game on a game animation system. The method includes identifying source animation curve data, where the source animation curve data describes change in a state of a control element over time; identifying a description of a first dependency graph, where the dependency graph defines transforms for the source animation curve data; and evaluating the first dependency graph at an interactive rate while executing the game.

Still another embodiment includes a game animation system. The game animation system includes a processor configured to execute a game; data representing a control element, wherein a change in a state of the control element is associated with a change in an orientation of a plurality of other elements; source animation curve data, where the source animation curve data describes change in the state the control element; a description of a first dependency graph defining transforms for the source animation curve data; and an engine for evaluating the first dependency graph at an interactive rate during execution of the game.

Yet another embodiment includes a game animation system. The game animation system includes a description of a first dependency graph for animating at least a portion of a first object, where the first object is defined at least in part by a plurality of interrelated elements; an animation engine configured to identify a plurality of subnetworks based on the first dependency graph, wherein each subnetwork comprises a plurality of nodes within the first dependency graph, and wherein the plurality of nodes in each subnetwork describe motion of at least two of the interrelated elements over time; and a plurality of processors, wherein each processor is configured to evaluate nodes of at least one subnetwork independent of the remaining nodes in the first dependency graph to animate motion associated with the at least two interrelated elements of the at least one subnetwork. The at least two subnetworks are evaluated by distinct processors.

Another embodiment includes a method of animating elements by a game system. The method includes providing a description of a first dependency graph for animating at least a portion of a first object, where the first object is defined at least in part by a plurality of interrelated elements; identifying a plurality of subnetworks each comprising a plurality of nodes within the first dependency graph, wherein the plurality of nodes in each subnetwork describe motion of at least two of the interrelated elements over time and can be evaluated independent of the remaining nodes in the dependency graph; assigning each subnetwork to one of a plurality of processors of the game system, wherein at least two subnetworks are assigned to distinct processors; and evaluating nodes in at least one subnetwork with a processor to which the subnetwork is assigned to animate motion associated with the at least two interrelated elements of the subnetwork.

DETAILED DESCRIPTION OF CERTAIN EMBODIMENTS

Figure 1:
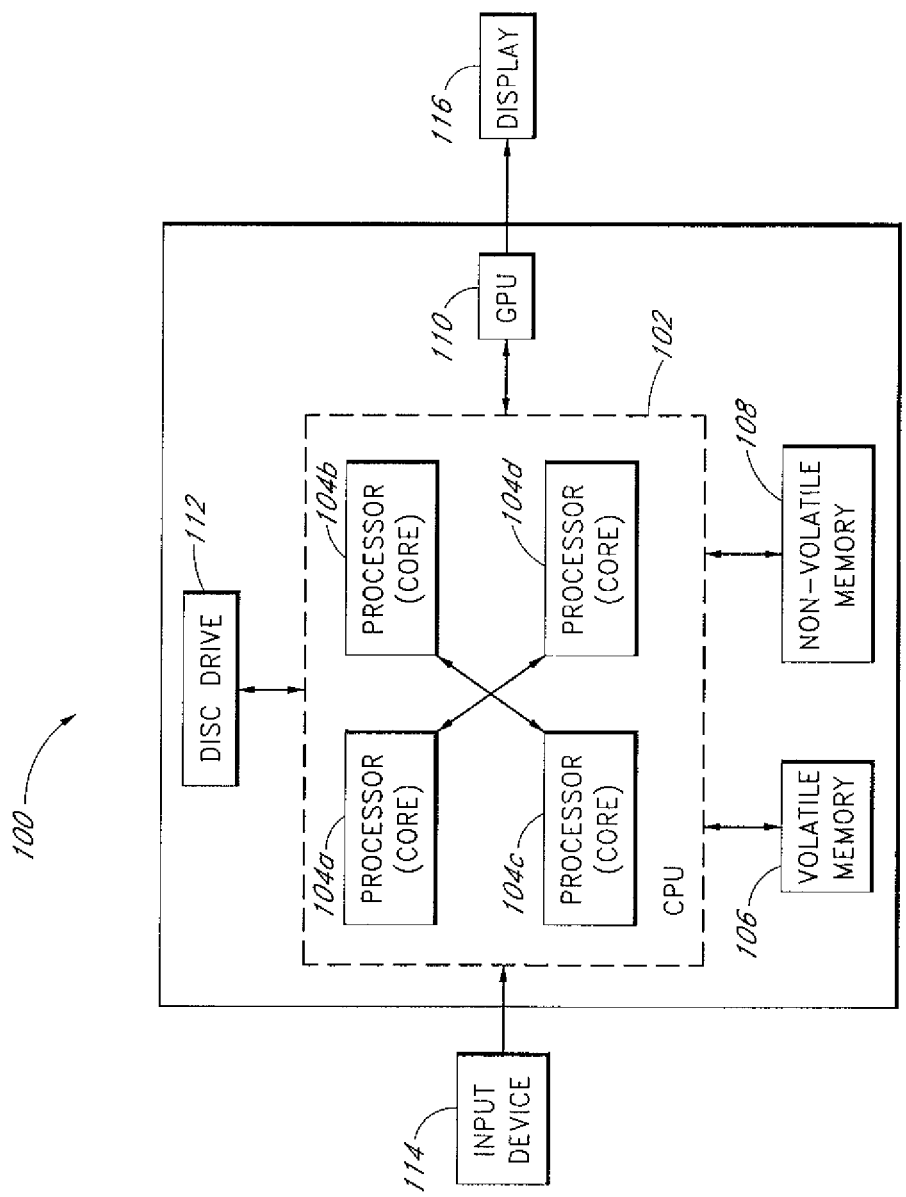
FIG. 1 is a diagram illustrating an example system for game animation including a plurality of processors.

The following detailed description is directed to certain examples and embodiments. The structure and operation of the present invention, however, is not limited to the examples and embodiments described herein. In addition, there is a multitude of different ways to implement such examples and embodiments and aspects described with reference thereto. It should be apparent that any specific structure and/or function that is disclosed herein is merely representative. Those skilled in the art will realize that disclosed aspects may be omitted, isolated, or combined in various ways. For example, an apparatus may be implemented or a method may be practiced using other structure, functionality, or structure and functionality in addition to or other than one or more of the aspects described herein.

Users of game systems have come to expect increasing complexity in gameplay and increasing complexity in graphics associated with such gameplay. Games are no longer two dimensional scenes with a goal at the end of each screen, but rather are often three dimensional scenes which may be representative of an entire fictional world or universe and associated with an intricate plot. In many games, the visual impact on the user is as important as any other aspect of the game, creating interest in the user and aiding in explanation of the plot. Increased graphic complexity additionally allows more detailed interactions within the game.

The increased expectations of users of game systems for improved game graphics have similarly increased the responsibility placed on animators who design and create the graphics. The animators must ensure that the graphics are colorful and visually stimulating, and include minute details that were previously impossible to animate using a game system. In addition, users demand that characters move in a physically accurate manner and that interactions within the game are believable. Games that include human characters generally must portray those human characters as lifelike.

Improved game graphics, however, have led to problems in game development. For example, as animators strive to meet the expectations of game system users, the amount of data necessary to encode all of the detail in the graphics has increased. Such increase in data has created logistical problems, such as how to store and transport the data. In many instances, data representing the graphics as created by the animator must be compressed and some cases reduced in quantity. As a result, the animations and graphics observed by the user are different than those created by the animator.

In one embodiment, an animator or other individual creates a dependency graph at a source for use in animating at least a portion of an object. In addition, the animator creates at least one animation curve representing a change in a state of a control element. The dependency graph and animation curve are exported to a game system. The game system evaluates the dependency graph during execution of a game to animate elements associated with the object using the animation curve. Motions are observed by a user of the game system without loss as compared to motions as created by the animator.

In one embodiment, the dependency graph is exported or stored in at least two data structures, where a first data structure includes nodes of the graph representing spatial or temporal values, and a second data structure includes nodes of the graph representing relationships. In another embodiment, the dependency graph may be evaluated by a plurality of processors of the game system. In still another embodiment, subnetworks of the dependency graph may be identified and manipulated separately. In yet another embodiment, animation curves can be combined for evaluation using the dependency graph, or inverse kinematics can be performed using a reconfigured dependency graph or a separate dependency graph.

FIG. 1 is a diagram illustrating an example system 100 for game animation. The game system 100 is configured to execute a game and to produce animations during execution of the game. The game system 100 is further configured to accept and process input from a user and to provide data for displaying the results of such user input.

The user inputs commands using an input device 114. The input device 114 may be any device that allows the user to interact with the game system 100. For example, the input device 114 may comprise a keyboard, a joystick, a controller, a microphone, a camera, a keypad, or a series of buttons, among other devices and features.

The game system 100 outputs graphics and animations to a display device 116, the display device 116 may be any device that receives data for display and presents it visually to the user. For example, the display device 116 may include a cathode ray tube, a plurality of light emitting diodes (LEDs), a liquid crystal display (LCD), or a projector, among other devices and features.

The game system 100 includes a central processing unit (CPU) 102 having a plurality of processors 104a, 104b, 104c, and 104d. The processors 104a-104d may also be referred to as cores. Although four processors 104a-104d are illustrated in FIG. 1, the game system 100 may include a greater or lesser number of processors. The processors may be implemented internal or external to the CPU 102. The CPU 102 may include one or more processors. For example, the CPU 102 may include one processor, three processors, or eight or more processors. The CPU 102 and/or at least one of the processors 104a-104d are in communication with the input device 114 and the display device 116.

The game system 100 may further include a volatile memory 106 in communication with the CPU 102 and/or at least one of the processors 104a-104d. The volatile memory 106 may comprise certain types of random access memory (RAM) such as dynamic random access memory (DRAM) or static random access memory (SRAM), or may comprise any other type of volatile memory. The volatile memory 106 may be used to store data and/or instructions during operation of the CPU 102 and/or one of the processors 104a-104d. Those skilled in the art will recognize other types of volatile memory and uses thereof.

The game system 100 may further include a non-volatile memory 108 in communication with the CPU 102 and/or at least one of the processors 104a-104d. The non-volatile memory may include flash memory, magnetic storage devices, hard disks, or read-only memory (ROM) such as erasable programmable read-only memory (EPROM), or any other type of non-volatile memory. The non-volatile memory 108 may be used to store games, instructions, character information, game status information, or any other information that is to be retained if power to the game system 100 is removed. The game system 100 may comprise an interface to install or temporarily locate additional non-volatile memory. Those skilled in the art will recognize other types of non-volatile memory and uses thereof.

A graphics processing unit (GPU) 110 in communication with the CPU 102 and/or at least one of the processors 104a-104d renders data supplied by one of the processors for display on the display device 116. The GPU 110 may be configured to perform any number of functions related to providing data for display on the display device 116. For example, the GPU 110 may be configured to render a plurality of polygons, apply shading or texture, create data representative of a three-dimensional environment, or convert between coordinate spaces, among other functions. The GPU 110 may be external to the CPU 102, as illustrated in FIG. 1, or internal to and/or integrated with the CPU 102. Those skilled in the art will recognize other configurations and functionalities of the GPU 110.

The game system 100 may further include a disc drive 112 in communication with the CPU 102 and/or at least one of the processors 104a-104d. One or more of the processors may read data from a disc inserted into the disc drive 112. In some embodiments, the game system 100 is configured to record data on the disc using the disc drive 112. In this way, data relating to gameplay and animation may be transported to or from the game system 100. For example, many games are sold on compact discs (CDs) or digital versatile discs (DVDs). A majority of these games are produced such that all information needed to play the game, including character, plot, and animation data, are included on the disc. Thus, a user may purchase a disc containing a game for execution on the game system 100. A game may also be stored on the non-volatile memory 108.

A game engine is stored on the game system 100. The game engine comprises instructions or data that can be used to execute a game. When a game is initialized, the game engine begins gameplay. During gameplay, the engine provides graphics and animations associated with a scene or moment in the game. These graphics and animations are displayed on the display device 116. When a user inputs a command using the input device 114, the game engine evaluates the commands and determines the effects of the command on the execution of the game. These effects may be reflected in the graphics and animations displayed to the user. For example, a user may press a button on a keypad to cause a character in the game to open a door.

The game engine 100 may be implemented or stored wholly or partially in any one of the CPU 102, the processors 104a-104d, the GPU 110, or the non-volatile memory 108. The game engine may comprise a single set of instructions or data, or may comprise multiple sets. For example, the game engine may be implemented as an animation engine such as a graphics or rendering engine and a separate engine for determining how a user's inputs affect the plot of the game.

In addition to the game engine, the game system 100 may store or implement other functionalities and subsystems for executing a game. For example, such subsystems include a rendering system, game save system, physics system, and a special effects system.

The game system 100 is not limited to the devices, configurations, and functionalities described above. For example, although a single volatile memory 106, non-volatile memory 108, GPU 110, disc drive 112, input device 114, and display device 116 are illustrated, a plurality of any of these devices may be implemented internal or external to the game system 100. In addition, the game system 100 may comprise a power supply or a network access device. Those skilled in the art will recognize other such configurations of the game system 100.

The components described herein may be implemented in a variety of systems and devices. For example, the game system 100 may comprise a console designed for execution of games, such as an arcade machine, a SONY PLAYSTATION 3, or a MICROSOFT XBOX 360. The game system 100 may also comprise a general computing device configured for execution of games, such as a laptop, desktop, or personal computer.

Graphics and animations for display by the game system 100 can be created using any number of methods and devices. Modeling software, such as MAYA, sold by AUTODESK, is often used, especially when generating graphics and animations representing a three dimensional environment. Using such software, an animator can create objects and motions for the objects that can be used by the game engine of the game system 100 to provide data for display on the display device 116.

Figure 2:
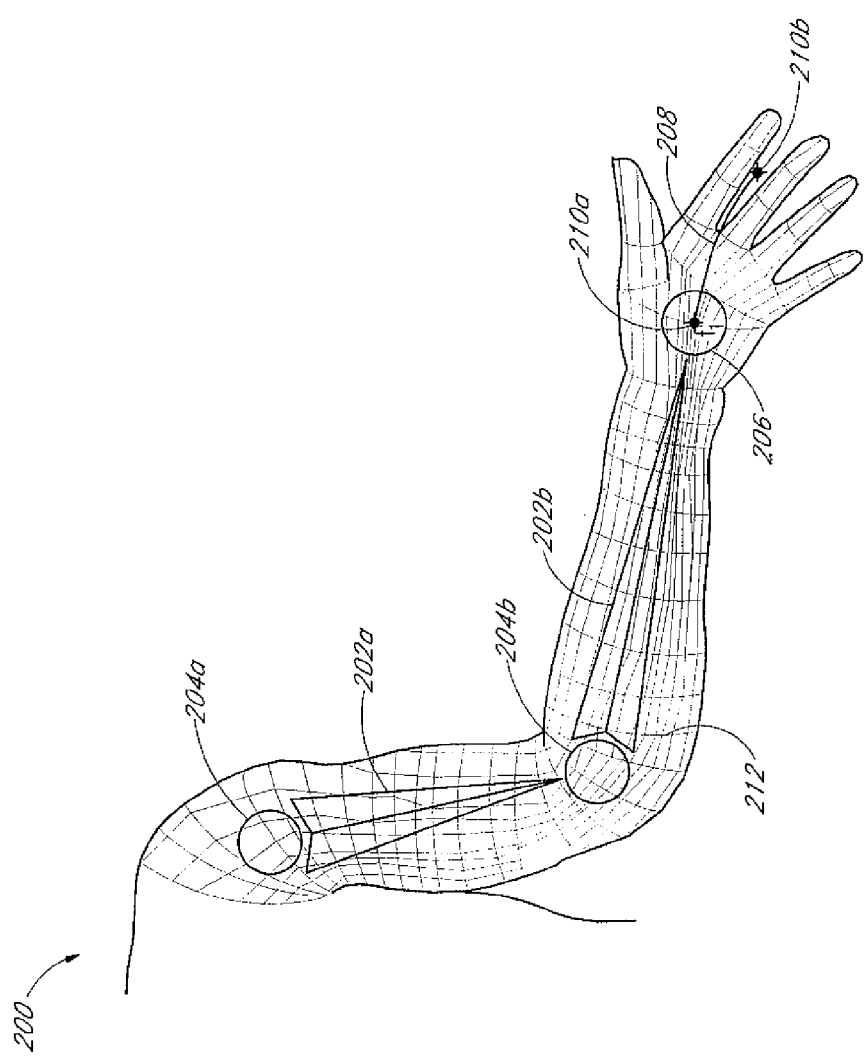
FIG. 2 is a diagram illustrating an example of a portion of an object having a skeleton with a mesh overlay, a control element, and an animation curve.

FIG. 2 is a diagram illustrating an example of a portion of an object 200 created using software as described above. In the illustrated embodiment, the object 200 is shown as being a human form, and the portion of the object comprises the shoulder and arm of the form. The object 200 may, however, be any object. For example, the object may comprise human or non-human characters, items such as weapons or food, walls or architecture including buildings, scenery elements such as rocks or trees, or any other object that the animator would like to illustrate. The descriptions of objects herein apply equally to all such objects.

The structure of the object 200 may be defined using a plurality of interrelated elements 202a, 202b, 204a, 204b, and 206. These interrelated elements are used to create a "skeleton" of the object 200. They define the shape and physical constraints of the object 200.

In the illustrated embodiment, the elements 202a and 202b are configured to change position and orientation, but their shape and size are substantially fixed. The elements 204a and 204b, however, are configured as joints defining locations about which elements 202a and 202b may be rotated.

The interrelated elements defining an object may be related by a dependency graph. The dependency graph contains hierarchical nodes describing how each element is connected to other elements and how each element moves with respect to other elements. In this way, the animator does not have to illustrate or animate every detail of an object for every possible scene or configuration within a game. For example, it is understood that when an individual rotates his shoulder, his forearm and hand will move. Similarly, the object 200 illustrated in FIG. 2 can be configured such that rotating element 202a about element 204a would cause the position or orientation of elements 202b and 204b to change. The contents and operation of the dependency graph are described in more detail below.

An animator can create a dependency graph for each object. In addition, portions of objects or a plurality of objects may be related by a dependency graph. In any given scene displayed during a game, there may multiple dependency graphs represented. For example, each character within a scene may have been modeled with a separate dependency graph by the animator. By assigning values and constraints to each node in the dependency graphs, the animator can control how the objects will be shaped and how the objects will move. If the animator does not want the object to move, this too can be defined in the dependency graph. For example, an animator may create a skeleton to define the shape of a wall, and would assign values to the nodes of the dependency graph for that wall such that the elements of the wall could not move in relation to each other.

The element 206 is a control element. It may comprise either of the types of elements 202 or 204, or may be a separate type of element. Animators may define control elements to simplify the process of adjusting the position or orientation of the object 200. Each object and dependency graph may have multiple control elements.

Figure 3:
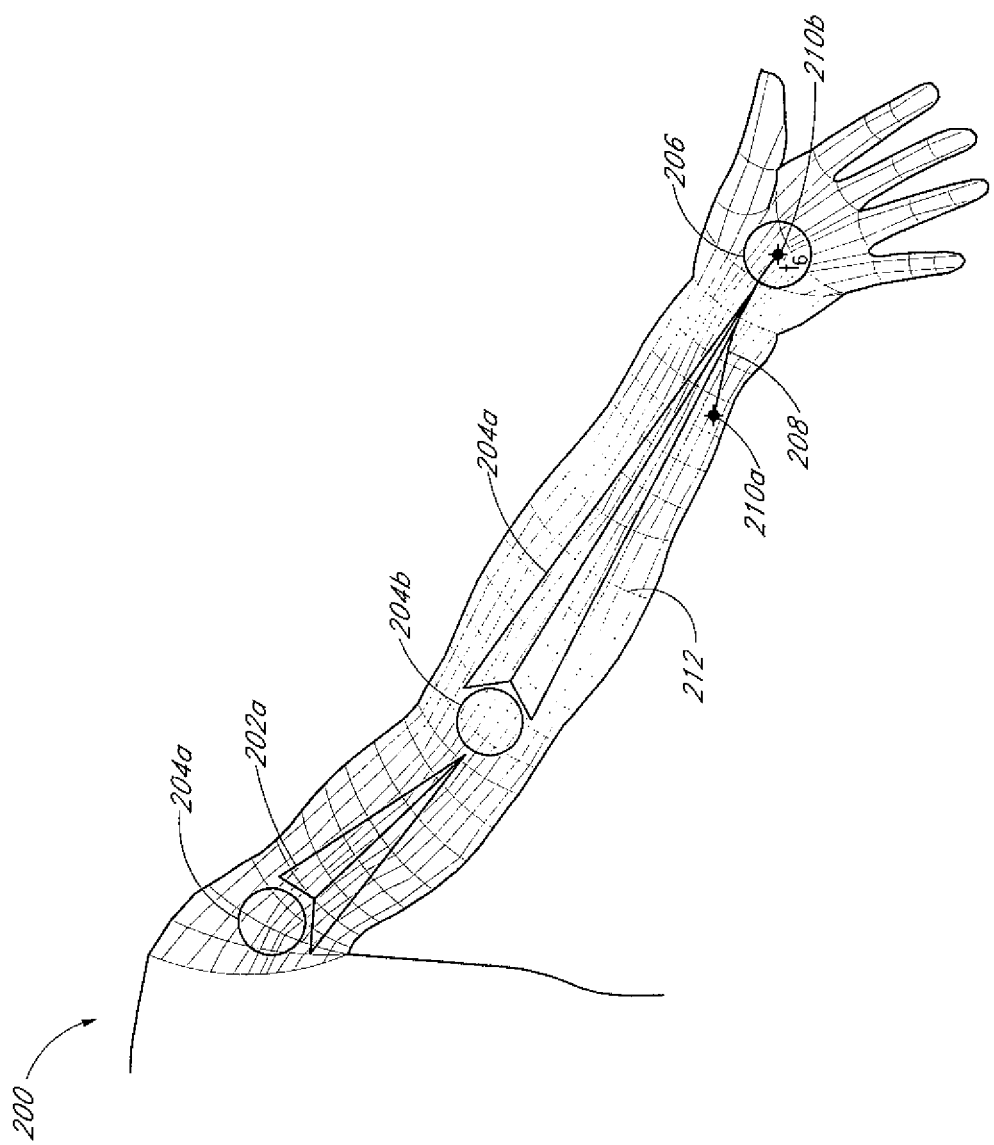
FIG. 3 is a diagram illustrating the portion of the skeleton from FIG. 2, where the control point has been moved along the animation curve.

A change in a state of a control element can be described by an animation curve. In the illustrated embodiment, a change in a position of the control element 206 can be described by the animation curve 208. The control element 206 is initially located at a first position 210a at time $t_1$. The control element 206 may be moved along the animation curve 208 over time. At time $t_6$, the control element 206 has been moved along the animation curve 208 such that the control element is located at a second position 210b, as illustrated in FIG. 3.

When a control element changes state, one or more other elements may be affected. In the illustrated embodiment, movement of the control element 206 along the animation curve 208 causes the elements 202a, 202b, 204a, and 204b to move. Such movement of other elements is caused by constraints defined in the dependency graph for the object 200. Thus, the dependency graph can be configured such that movement of a character's hand causes proper anatomical movement of the character's arm and shoulder, as illustrated in FIGS. 2 and 3. Therefore, the position of each of the elements 202a, 202b, 204a, and 204b does not need to be manually set by the animator each time the animator wishes to illustrate the control element 206 at a different position, but can be calculated automatically by evaluating the dependency graph of the object 200.

Control elements are not limited to a single point in space, nor are animation curves limited to a path of an element over time. Control elements and animation curves can be defined to affect any number of elements in any number of ways. For example, a control element can be defined relative to a dependency graph describing a character's hand such that adjusting a state of the control element results in the hand being more or less opened or closed. The animation curve would describe the change in the control element, and may comprise abstract values. As an example, the control element for opening or closing a character's hand may be defined such that the control element may be assigned any value from 1 to 10, with 1 representing that the hand is open and 10 representing that the hand is closed. Any value between 1 and 10 would represent that the hand is partially opened or closed. An animation curve for this control element might comprise a chronological series of numbers describing a predetermined set of opening or closing motions for the hand over a period of time, where each number has a value from 1 to 10. Thus, an animation curve defining a repeated clenching motion of the hand might comprise the series {8, 9, 10, 9, 8, 7, 8, 9, 10, 9, 8, 9, 10}. Similarly, a control element that may be assigned a value from 1 to 10 may be associated with a door such that 1 represents the door being closed and 10 represents the door being opened as far as it can be opened. In some embodiments, a control element is used to adjust a color, shading, or texture of an element or plurality of elements.

Animation curves may represent movement for predetermined actions. In the illustrated embodiment, the animation curve 208 may represent a character extending his hand to shake hands with another character. As another example, a control element may be defined on a character's foot and an animation curve defined to animate the character walking. During gameplay, this animation curve may be invoked by a user pressing a left button on a keypad, causing the character to walk left by moving the control point in the character's foot along the animation curve.

Animation curves can be stored or represented in any number of ways. For example, an animation curve may be stored as a series of values, a data structure, or as a set of executable instructions for manipulating a control element. An animation curve may be represented by a plotted function or in another visual way, or there may be no comprehensible way to visually represent a given animation curve. Those of skill in the art will recognize other ways in which animation curves may be stored, defined, or represented. Animation curves as herein described may be implemented in certain modeling software programs, for example MAYA.

The skeleton may be overlaid, or bound, with a skin or mesh 212. The mesh 212 may define the outward appearance of the object 200, while the skeleton defines the underlying structure and movement of the object 200. Thus, the skeleton or a portion thereof may not be visible to a viewer when the mesh overlays that skeleton or portion thereof. In the illustrated embodiment, the mesh 212 is configured to give the illustrated portion of the object 200 the appearance of a human shoulder, arm, and hand. When any of the elements 202a, 202b, 204a, 204b, or 206 are moved, the mesh will be laid over the new position, creating the appearance that the arm has changed position.

The mesh 212 may not only convey a more recognizable image to the user than the elements 202a, 202b, 204a, 204b, and 206 would convey, but the mesh 212 may be used to illustrate minute details that are not affected by movement of the elements 202a, 202b, 204a, 204b, and 206. For example, a skeleton may be defined to represent the structure of a car. While the car may change locations, the majority of the car will not move in relation to the rest of the car, with the exception of the doors, hood, trunk, tires, and windows. A mesh can be bound to the skeleton of the car defining intricate curves and molding that may change positions within a scene, but will otherwise never change orientation with respect to other portions of the car. Defining structural elements for each of these curve or molding details would provide no additional benefit to the animator.

A skeleton with defined constraints and motions, control elements, and a mesh may be referred to as a "rig." Creating these elements and associating them together may be referred to as "rigging." After the rigging process is complete, the object is generally ready to animate. The animator can then adjust the control elements and define animation curves to animate motions and actions for the object. A "rig" may also sometimes refer to such a skeleton and control elements without a mesh. Those skilled in the art will recognize various methods for creating rigs and dependency graphs, and will be able to create such rigs and dependency graphs.

Figure 4:
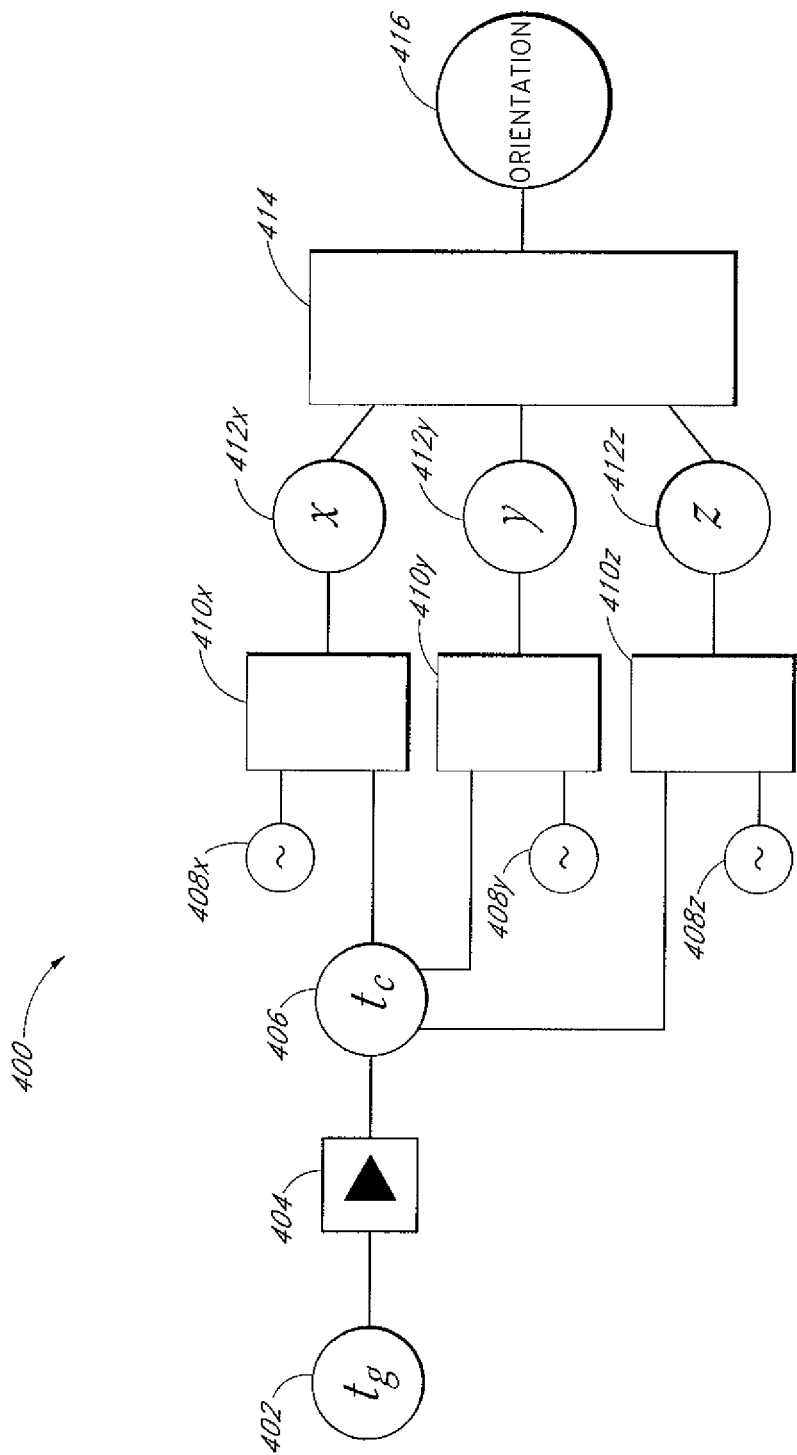
FIG. 4 is a block diagram illustrating an example of a portion of a dependency graph for animating an element, such as an element of the skeleton from FIG. 2.

FIG. 4 is a block diagram illustrating an example of a portion of a dependency graph 400 for animating an element, such as element 206 of the skeleton, or rig, from FIG. 3. The illustrated portion of the dependency graph 400 includes a plurality of nodes 402-416. The nodes include both nodes storing values, such as the nodes 402, 406, 408, 412, and 416, and functional nodes such as the nodes 404, 410, and 414. In the case where the value nodes 402, 406, 408, 412, and 416 are storing information relating to the object described in FIG. 2, the value nodes 402, 406, 408, 412, and 416 may store spatial or temporal values. Functional nodes may calculate a result based on data in value nodes, and thus may define a relationship between value nodes.

Value nodes may be stored or implemented as variables or values such as in floating point numbers, as data structures, or as arrays or collections of data. Functional nodes may be stored as operations, mathematical functions, sets of commands, or executable instructions. In some embodiments, the value nodes may be integral with the functional nodes, such as in attributes of the functional nodes. In some embodiments, nodes of the dependency graph may hold shape or geometry information, color information, or texture information. Similarly, a dependency graph containing such nodes or a portion of such a dependency graph may be stored or implemented as a data structure or series of data structures, commands or executable instructions, or a series of linked nodes. Those of skill in the art will recognize other ways in which a dependency graph and nodes thereof may be stored, defined, represented, or implemented, and will recognize additional information that nodes may store. Dependency graphs and nodes as herein described may be implemented in certain modeling software programs, for example MAYA.

In the illustrated embodiment, the portion of the dependency graph 400 may be evaluated from left to right. In this way, the portion of the dependency graph 400 may be evaluated to convert a time in the game $t_g$ into a final orientation of an element. To do this, the portion of the dependency graph 400 defines transforms for the animation curve. In some embodiments, the portion of the dependency graph 400 may also or instead be evaluated from right to left, or may be reconfigured such that it can be evaluated from right to left.

The time in the game $t_g$ is stored or identified at node 402. At node 404, tg is converted into a time along an animation curve $t_c$, which is stored or identified at node 406. For example, the animation curve may represent a character walking, as described above. Animating the motions associated with the animation curve, however, may only require 5 seconds. Based on the character's previous motions or an amount of time that the character has been walking, it may be determined at node 404 that the character is 3 seconds into the animation curve, or the animation curve has been 60% completed, for example. With reference to FIG. 2, a user may have been playing the game for 20 minutes ($t_g$ is therefore equivalent to 20 minutes), but it may be determined that the motion associated with the animation curve 208 is just beginning, and $t_c$ is thus determined to be equivalent to $t_1$. This value may be stored at node 406.

At node 410, the time along the animation curve is evaluated with the animation curve 408 or a portion thereof to determine a position of an element at that time. With reference to FIG. 2, the animation curve 208 may be split into a curve in an x plane, a curve in a y plane, and a curve in a z plane, represented by the nodes 408x, 408y, and 408z, respectively. Each of these curve portions 408x, 408y, and 408z are evaluated at time $t_c$ at the node 410x, 410y, and 410z, respectively. The x, y, and z positions of the element may be stored at nodes 412x, 412y, and 412z, respectively. Thus, the nodes 412x, 412y, and 412z would store the x, y, and z positions, respectively, of the element 206 at time $t_1$.

The orientation of the element can be stored or identified at node 416 using the node 414 and the x, y, and z positions identified at the nodes 412x, 412y, and 412z, respectively. This orientation may comprise any amount of data describing the orientation, such as the x, y, and z values previously identified and/or a rotation of the element, among other such orientation data. With reference to FIG. 3, the node 416 stores or identifies the orientation of the element 206 at time $t_1$, which is equivalent to the position 210a.

Those skilled in the art will recognize that a dependency graph may contain more nodes than those illustrated in FIG. 4, or the dependency graph may comprise additional or fewer values or functions than described above. For example, many of the portions of the dependency graph 400 may be linked to define motion of an object, such as the object 200. Consider, for example, the case in which the element 204a in FIG. 2 is rotated. In summary, the rotation of the element 204a may result in the following: a new position of the element 202a could be determined by evaluating a portion of a dependency graph based on the rotation of the element 204a; based on the position of the element 202a, a new position of the element 204b could be determined by evaluating a portion of the dependency graph; based on the position of the element 204b and a rotation of the element 204b, a new position of the element 202b could be determined; and based on the position of the element 202b, a position of the element 206 could be determined. Thus, the dependency graph may be evaluated to determine the orientation of any element in an object represented by the dependency graph.

When evaluating a dependency graph as described above, a value of a node may change when a value of a "parent" node-any node located higher up in the hierarchy of the dependency graph; in the embodiment of the object 200 illustrated in FIG. 2, any node in the dependency graph representing an element of the object 200 located to the left of a given illustrated element would be a parent node to a node representing the given element-changes. Thus, a previously determined value may no longer be value for any given node. To indicate this, each value node may contain an indicator of whether the value therein is still valid. For example, the node may contain a flag indicating that the node is dirty (i.e. the value has changed), or a counter or validity indicator that may be used to determine if the value has changed, as described in more detail below.

Figure 5:
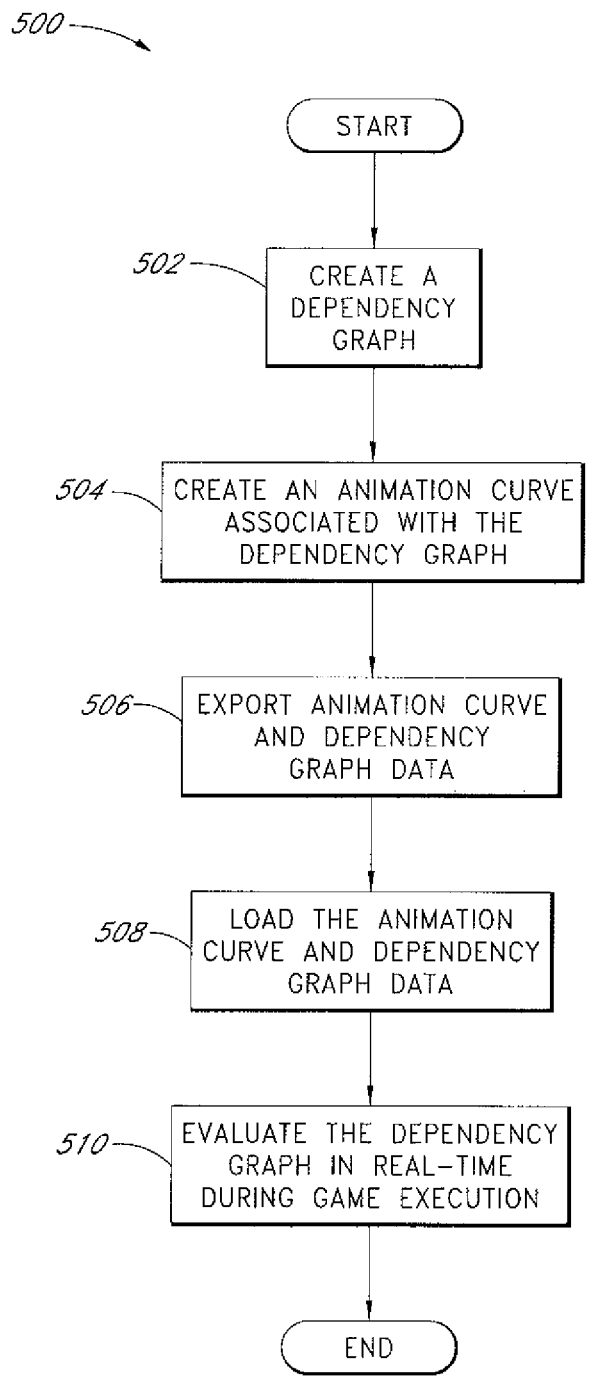
FIG. 5 is a flowchart illustrating an example of a method for creating and evaluating a dependency graph for animation during a game.

FIG. 5 is a flowchart illustrating an example of a method 500 for creating and evaluating a dependency graph, such as the portion of the dependency graph illustrated in FIG. 4, for animation during a game. At block 502, an animator creates a dependency graph. The animator may create the dependency graph using a computing device, such as a laptop, desktop, or personal computer, or using any other device that allows creation of a dependency graph or rig as herein described. Such device may be referred to as a source, because it is the animator's source of creation.

At block 504, the animator creates an animation curve associated with the dependency graph using the source device or another source device. Hereinafter, such animation curve may be referred to as a source animation curve because it was created at a source device. As described above, the animation curve may describe change in a state of a control element of the dependency graph. The dependency graph, in turn, may describe transforms for the animation curve.

At block 506, animation curve and dependency graph data are exported. This may involve packaging the animation curve and dependency graph or compressing the animation curve or dependency graph such that the animation curve and dependency graph may be used by a game system, such as the game system 100 illustrated in FIG. 1. In some embodiments, block 506 comprises burning the dependency graph and animation curve data onto a disc. In other embodiments, block 506 comprises packaging the dependency graph and animation curve data into an executable file readable by the game system 100.

At block 508, the animation curve and dependency graph data are loaded on the game system. In the illustrated game system 100, the dependency graph and animation curve data may be loaded into or stored in one or more of the volatile memory 106, non-volatile memory 108, CPU 102, or any of the processor 104a-104d. The dependency graph data and animation curve data may be transported to the game system 100 using a variety of methods. For example, the dependency graph and animation curve data may be stored on a disc, and the disc may be loaded into the disc drive 112 to provide the game system 100 with the dependency graph and animation curve data. In some embodiments, the dependency graph and animation curve data is transmitted over a network and received at the game system 100 using a network interface.

During execution of a game at block 510, the dependency graph is evaluated. In one embodiment, the dependency graph is evaluated by a game engine. In such embodiment, the game engine may sequentially evaluate each node within the graph, or evaluate only nodes that are dirty. Evaluation may comprise reading instructions stored within the nodes, or performing processes defined in the game engine using values or functions stored in the nodes, among other operations. Evaluation may also comprise processing or effecting hierarchical executable instructions. An embodiment of an example method of evaluating a dependency graph is described in more detail below.

As described above, the dependency graph was created at a source device. Those skilled in the art will appreciate that this dependency graph created at a source device is evaluated at the game system. The dependency graph may be evaluated in real-time, so as to maintain interaction with a user of the game system. In this way, response of the game system to user inputs or animation of game elements will not lag or be delayed. Thus, the dependency graph may be evaluated at an interactive rate such that evaluation of the dependency graph during execution of a game will not cause substantial interruption in the execution of the game or the response of the game to inputs from the user.

Figure 6:
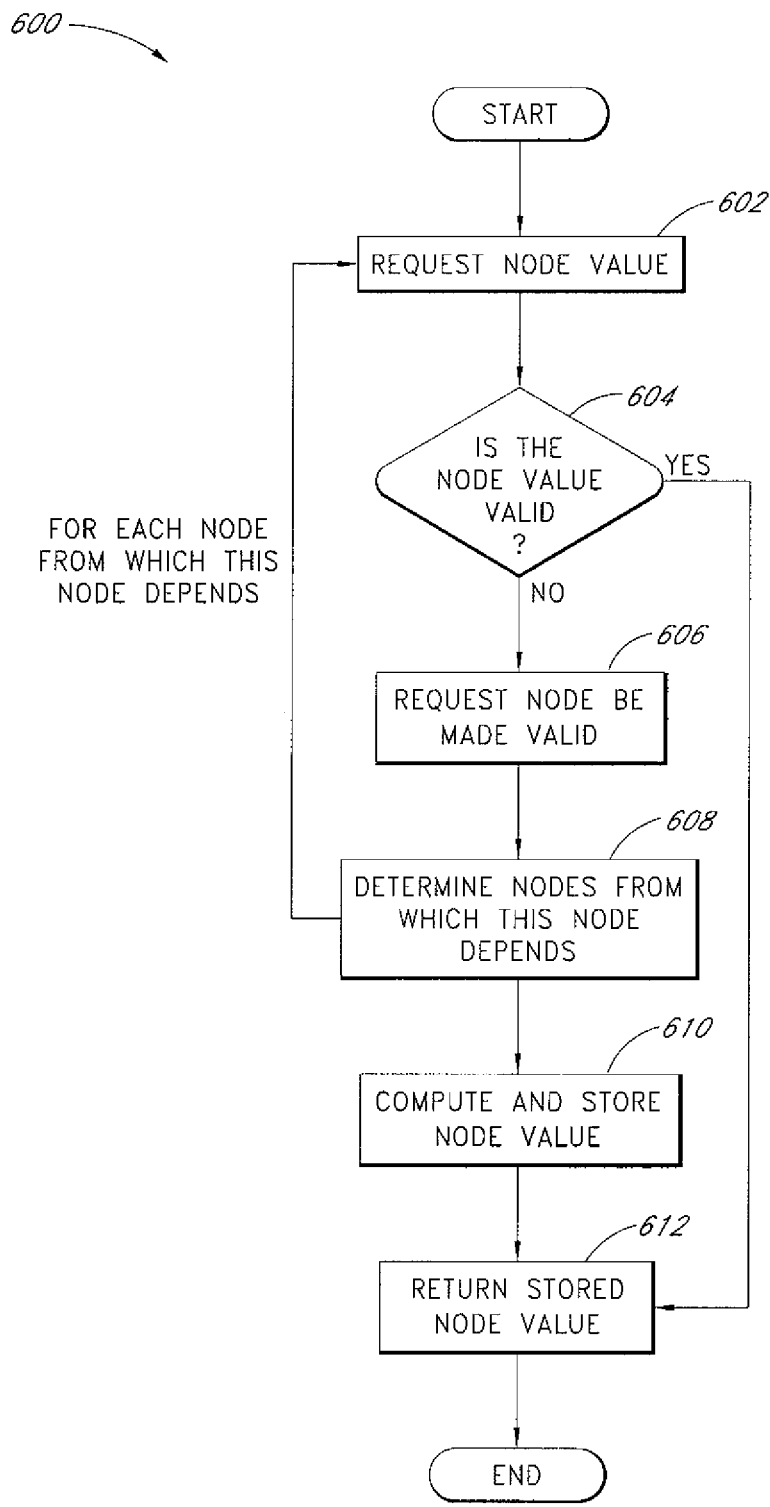
FIG. 6 is a flowchart further illustrating an example of a method of evaluation of a dependency graph, and illustrating retrieving node values from the dependency graph.

FIG. 6 is a flowchart further illustrating an example of a method 600 of evaluating a dependency graph with a game engine, such as the game engine described in reference to the system 100 illustrated in FIG. 1. The method 600 may be performed during execution of the block 510 in FIG. 5.

At block 602, a node value is requested. For example, the node value may be requested in order to animate an object or portion thereof in the context of an animation curve, as described above in reference to FIGS. 2-4. As that an orientation of a plurality of elements may change at each point along the animation curve, the engine requests the value of the node. The value returned by the node may be used to provide animation data for display, such as on the display device 116 illustrated in FIG. 1.

At block 604, it is determined whether the node value is valid. Such determination may utilize a validity indicator, as described above. For example, the game engine may check a dirty flag to see if a current value of the node may be different than stored therein, for example due to a parent node being changed. The game engine may also make such determination based at least in part on a counter in the node, as will be described in more detail below.

If the node is valid, the game engine proceeds to block 612, where the value of the node is returned. If the node value is not valid, the game engine proceeds to block 606.

At block 606, the node is requested to be made valid. To make the node valid, the nodes from which the present node (i.e. the node from which the value was requested at block 602) depend are determined at block 608. For dependency graphs described herein, all nodes that are higher up in the dependency graph hierarchy than the present node will be identified at block 608.

The method 600 then is repeated for any nodes from which the present node depends. If the nodes from which the present node depends are valid, their values will be returned. If they are not valid, they will be requested to be made valid, as described above.

After the nodes from which the present node depends return their value, the value of the present node can be computed at block 610 by reference to the values of the nodes from which the present node depends. This computed value is stored in the present node. At block 612, this calculated value is returned. The value can then be used to animate the element represented by the present node.

Evaluating a dependency graph with a game system, for example using the game engine of the game system 100 as described above in reference to FIG. 6, to animate at least a portion of an object provides many advantages. Other methods of providing data for animating an object include "baking" the positioning of the elements in the character's skeleton in a multitude of configurations. For example, a snapshot of the values of every element is taken at each point in an animation curve. This data may include up to twelve or more values for each element: nine values to represent the element's rotation in three dimensions, and three values to represent the element's position in x, y, and z coordinates. In order to capture an object's movement, the values of each element must be stored for each point in an animation curve for every possible animation curve.

As those of skill in the art will understand, the baking process creates large amounts of data. The amount of data is often too cumbersome to read and utilize during execution of the game, and is often too great to be contained on a single disc for transporting the game. Consequently, data representing motion of the object is often compressed and it is common to omit some of the baked data. When animating an object based on this compressed or incomplete data, the motion of the object will at best be an estimation of the animation created at the source, and it will be difficult to make any alterations of the animations during execution of the game.

Contrary to utilizing baked data, evaluating a dependency graph and a source animation curve with a game system decreases the amount of data required to animate an object and increases the aesthetics of the animation. The amount of compression that is used on the animation data can be limited or eliminated, and motion of the object can be displayed without loss as compared to the motion of the object created at the source.

The following descriptions discuss in further detail advantages of the systems and methods described above. Such advantages include reducing the amount of data exported to a game system, increasing the efficiency of evaluating that data, animating with greater accuracy, and being able to adapt and modify the source animation. In addition, further details and implementations of the systems and methods will be described in the context of those advantages.

Reduced Amounts of Data

The amount of data exported to a game system for use in animation can be reduced. Instead of exporting the values of every element of an object or portion thereof at every position of every animation curve, a dependency graph can be exported, which describes every element of the object or portion thereof, and the source animation curves can be exported. The values of each element may be determined by evaluating the dependency graph with respect to the source animation curves, obviating the need to export the values of each element.

Figure 7:
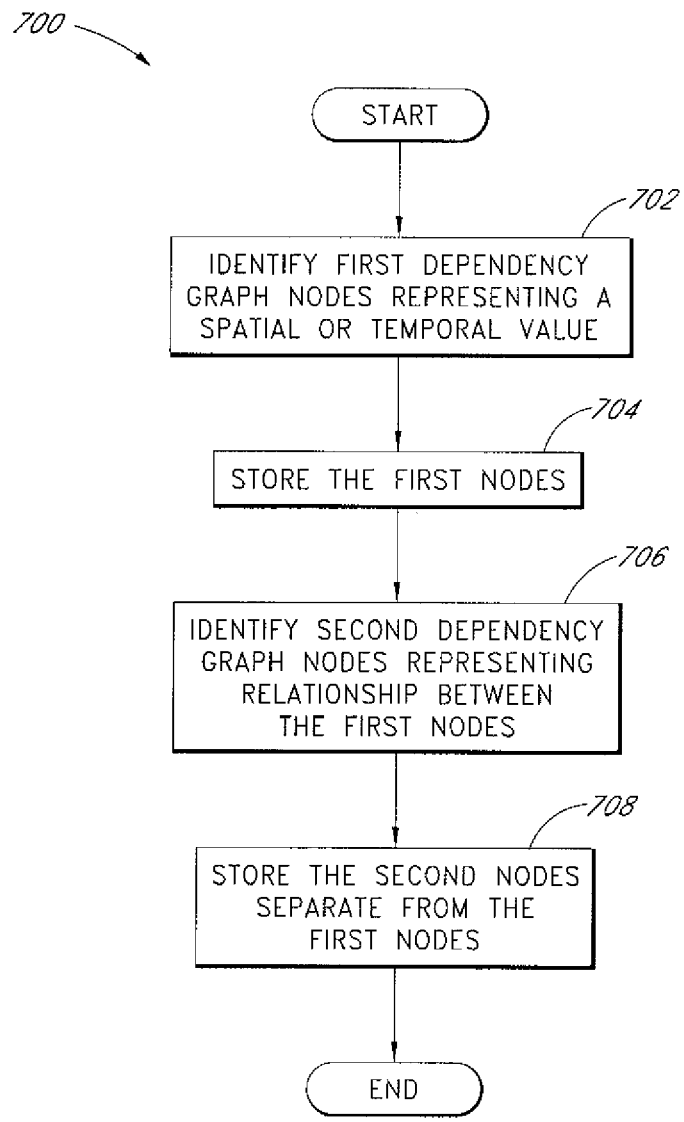
FIG. 7 is a flowchart illustrating an example of a method for exporting nodes in a dependency graph from a source.

The amount of data used to export the dependency graph may be further reduced by appropriately exporting nodes in the dependency graph. FIG. 7 is a flowchart illustrating an example of a method for exporting nodes in a dependency graph, such as the portion of the dependency graph 400 illustrated in FIG. 4, from a source. The method 700 may be used at block 506 of the method 500, illustrated in FIG. 5.

At block 702, first dependency graph nodes representing a value, such as a spatial or temporal value, are identified. With reference to the portion of the dependency graph 400, the value nodes 402, 406, 408, and 412 would be identified at block 702.

At block 704, the first nodes are stored. The first nodes may be stored in a first data structure readable by a game system, such as the game system 100 illustrated in FIG. 1.

At block 706, second dependency graph nodes representing a relationship between the first nodes are identified. With reference to the portion of the dependency graph 400, the function nodes 404, 410, and 414 would be identified at block 706. The identified nodes may represent a relationship between a first spatial or temporal value of an element represented in the dependency graph and a second temporal or spatial value of one an element represented in the dependency graph. For example, a node identified at block 706 may be used to determine a position or orientation of a first element based on a position or orientation of a second element to which the first element is connected.

At block 708, the second nodes are stored separate from the first nodes. The second nodes may be stored in a second data structure readable by the game system, where the second data structure is distinct from the first data structure. In this way, two data structures may be stored, separating the values represented in the dependency graph from the functionalities represented in the dependency graph. Such separation may be paired with appropriate data structures that reduce the amount of data required to store this information or may aid in culling out excess information stored in the dependency graph that is not useful to the game system when animating the object or portion thereof.

In some embodiments, the method 700 is used to export a dependency graph to two separate data structures. In other embodiments, a plurality of first data structures and/or a plurality of second data structures are stored. The plurality of first data structures may store data representing different node values, or the first data structures may contain store data representing at least some of the same node values, such as for redundancy and error correction purposes. After export, such first data structures and second data structures may be stored on the game system, such as in the non-volatile memory 108 in the game system 100, or in the volatile memory 106 after being read from a disc inserted in the disc drive 112.

Exporting nodes using the method 700 may aid in reducing the amount of data used by the source when creating the dependency graph, but not used by the game system when animating an object or portion thereof represented by the dependency graph. For example, the source device may store the world coordinates of every element when the game system may only need local coordinates of the element, as described in more detail below. These world coordinates may sometimes be omitted from the node values. The source device may also store constraints or extraneous data useful in designing the dependency graph and rig, but relatively useless to just the movement of the elements. These constraints and extraneous data may be omitted when exporting the dependency graph.

Those of skill in the art will appreciate that the dependency graph may be exported and stored in any number of ways, including using the method 700 described above. The dependency graph may not be stored in the game system in the same form in which it was created at the source, but a description of the dependency graph or data representing the source dependency graph may be stored instead. As described above, this may reduce the amounts of data required to store the dependency graph, and may ease execution by the game system. Similarly, a description of a source animation curve or data representing the source animation curve may be stored in the game system instead of the exact animation curve as defined at the source.

Those skilled in the art will appreciate that the example method 700 described above with reference to FIG. 7 and evaluation of a dependency graph by a game system can be used to reduce the amount of data required to be exported to the system. Thus, more detailed animation can be achieved and less data must be transported or stored.

More Efficient Data Evaluation

Exporting the dependency graph for use by a game system can also increase performance of the game system. Not only can the game system animate an object or portion thereof without caching or paging through as much data, but the dependency graph is more easily parallelizable for evaluation by a plurality of process, such as the processors 104a-104d illustrated in FIG. 1.

Figure 8:
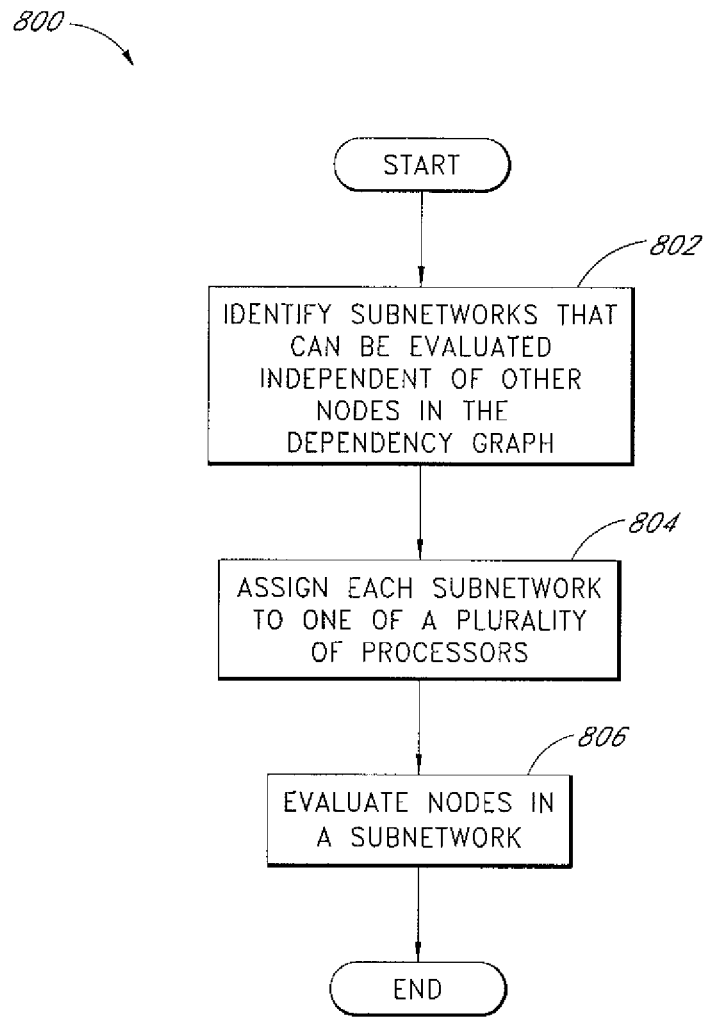
FIG. 8 is a flowchart illustrating an example of a method for evaluating a dependency graph using a plurality of processors, such as illustrated in FIG. 1.

FIG. 8 is a flowchart illustrating an example of a method 800 for evaluating a dependency graph using a plurality of processors, such as the processors 104a-104d. At block 802, subnetworks of the dependency graph that can be evaluated independent of each other are identified. For example, consider the rig of the car discussed earlier in reference to FIGS. 2 and 3. Each element defining the skeleton of the car will be represented by a node in the dependency graph. Those nodes can be grouped into a plurality networks, herein referred to as subnetworks because they comprise a portion of the whole dependency graph, which can each be evaluated relatively independent of each other. Each door, for example, may be opened or closed independent of the other doors and of the rest of the car. The windows, trunk, and hood are similarly independent.

In one embodiment, the identification of subnetworks at block 802 is performed by a game engine, such as the game engine discussed above in reference to FIG. 1. In another embodiment, the subnetworks are identified at the source device, and separate data structures are exported for each subnetwork. For example, block 702 of the method 700 may comprise identify first dependency graph nodes of a subnetwork representing a value. Block 704 may comprise storing those identified nodes of the subnetwork. Similarly, blocks 706 and 708 may comprise identifying and storing nodes of the subnetwork representing a relationship between nodes of the first subnetwork. In this embodiment, the game engine need only identify the separate data structures, thereby identifying the separate subnetworks.

At block 804, each subnetwork is assigned to one of a plurality of processors, such as the processors 104a-104d. The subnetworks may be evenly or unevenly distributed among the processors. Such distribution may be determined randomly, or a workload for evaluating the subnetworks may be estimated, for example based on the size or complexity of the subnetwork.

At block 806, the nodes in a subnetwork are evaluated with the processor to which it has been assigned. Those of skill in the art will appreciate that a plurality of subnetworks may be evaluated concurrently using this method, up to the number of separate processors in the game system. Thus, the dependency graph can be evaluated more efficiently, and the burden on any one processor can be reduced.

The subnetworks identified at block 802 may be used to improve the efficiency of evaluation of the dependency graph in other ways as well. One such way is by maintaining a counter in each node representing the number of times that a value in that node has been changed or updated. When determining whether the value for that node is valid, the counter can be compared to counters of other nodes in the subnetwork. If the counter of the present node is lower than the counter of any parent node, then the value in the present node is invalid and must be updated before it can be returned. The counter of the present node may then be updated to be equivalent to a counter in a parent node, or the counters may be reset to a common value.

Other methods of evaluating dependency graphs require that a dirty flag in each node be set to indicate that the value in the node is not longer valid. Thus, when a value in a parent node is changed, the dependency graph must be traversed to set the dirty flag in each child of that parent node. In the counter method described above, however, only the counter in the parent node would be updated and child nodes would only need to consult the other nodes in their subnetwork, not the entire dependency graph. Alternatively, a dirty flag in only the nodes in the subnetwork may be set each time a value of a parent node in the subnetwork is changed, thus eliminating the need to traverse the rest of the dependency graph. This may greatly reduce the amount of processing required to animate an object represented by a dependency graph and reduce the amount of time required for such animation.

Another method that may be used to efficiently identify dirty nodes includes defining a global and/or group validity indicator, as well as defining validity indicators in each node of a dependency graph. Each validity indicator holds, stores, or defines a value. When a value of a node in the dependency graph is requested, the validity indicator for that node is compared to the global validity indicator. If the values of the two nodes differ, then the node is dirty and must be updated.

When a node of the dependency graph is changed or modified due to input received from outside of the dependency graph—for example, due to user input or due to time elapsing within the game—the global validity indicator is set to a new value and the validity indicator of the node that was changed is set to a value equivalent to the new value of the global validity indicator. When a node of the dependency graph is changed due to input received from within the dependency graph, however, only the validity indicator of that node is set to a value equivalent to the value of the global validity indicator. The global validity indicator is not set to a new value. Thus, if a node of the dependency graph is updated due to movement of other nodes within the dependency graph, then a new global validity indicator will not be set. Only the nodes that have changed since a node of the dependency graph was modified due to an outside input will reflect the newest global validity indicator. In this way, a node can be determined to be dirty by a single comparison with the global validity indicator, and the entire dependency graph need not be traversed to set dirty flags.

In addition to or in place of a global validity indicator, one or more group validity indicators may be defined. A group validity indicator may be defined to represent any grouping of nodes in the dependency graph. For example, group validity indicators may be defined for each subnetwork in the dependency graph, or a group validity indicator may be defined for a collection of subnetworks. A group validity indicator may also be defined for a meta network linking two dependency graphs. Meta networks will be described in more detail below. Use of group validity indicators is similar to use of a global validity indicator. A change in a node caused by an input from outside a group would cause the group validity indicator to be updated.

Validity indicators may be stored in a node. A global or group validity indicator stored in a node may be connected to one or more dependency graphs, groups, and/or subnetworks so as to define a parent node of a respective dependency graph, group, or subnetwork. A global or group validity indicator may also be stored independently of any dependency graphs, groups, or subnetworks. In addition, validity indicators may comprise a counter, or may comprise any other value suitable for comparison. For example, a numerical global validity indicator may be increased by a value of one each time it is changed. Those of skill in the art will recognize that a counter, such as may be used to represent a node validity indicator, is not limited to increasing each time it is changed and is not be limited to increasing at a constant rate. Counters may increase or decrease by any value.

The subnetworks identified at block 802 may further improve the efficiency of evaluation of the dependency graph by simplifying the coordinate systems used to animate an object or portion thereof. Dependency graphs are commonly evaluated in world coordinates, and game system commonly utilize the world coordinates of baked elements to provide data for animation. The subnetworks, however, may be used to define local coordinates.

Figure 9:
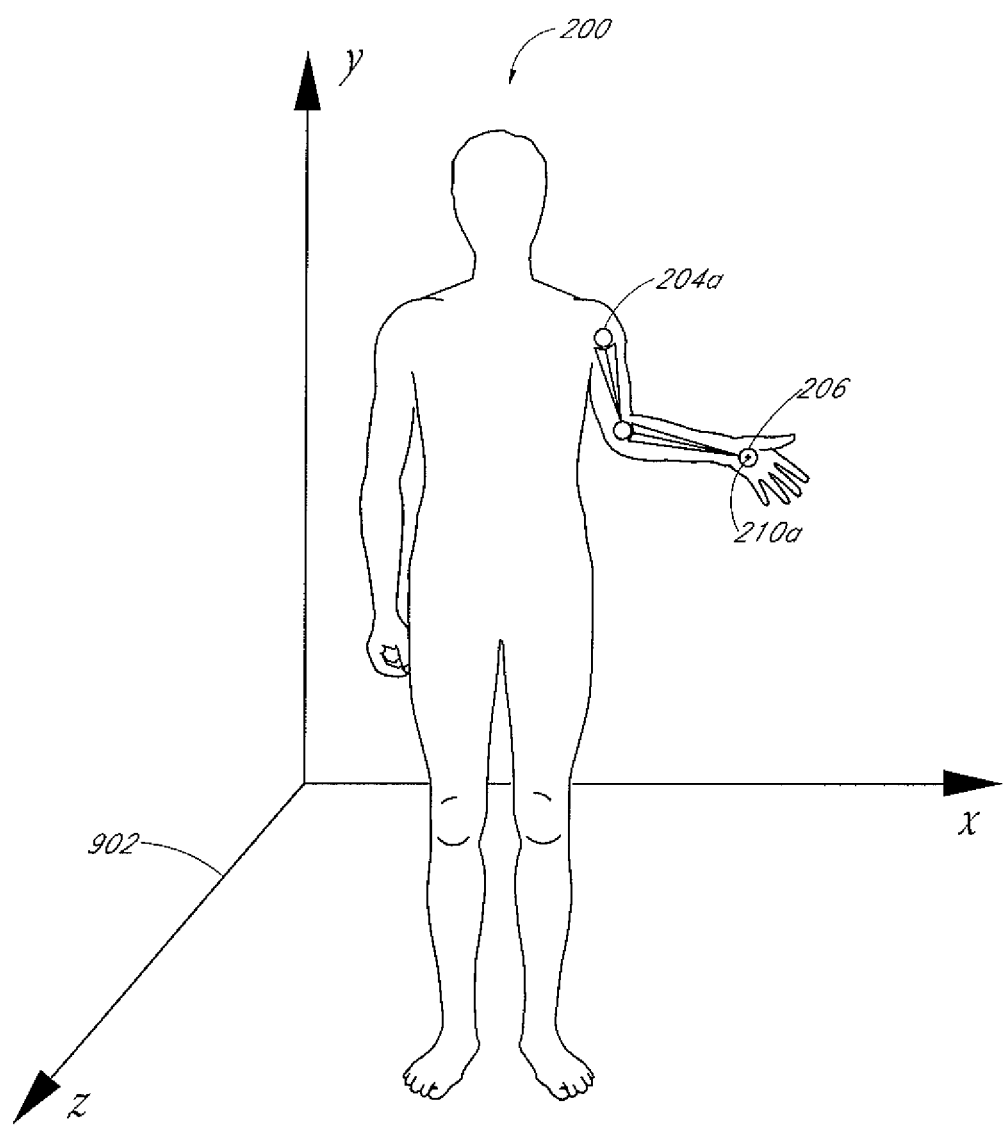
FIG. 9 is a diagram illustrating an example of an element having a position determined in a world coordinate space.

FIG. 9 is a diagram illustrating an example of the element 206, illustrated initially in FIG. 2, having a position determined in a world coordinate space. As described above, the element 206 is a portion of skeleton defining the structure of the object 200. In the embodiment illustrated in FIG. 9, the entire human form of the object 200 is visible. In FIG. 2, only the portion of the form comprising the shoulder and arm containing the element 206 was visible.

In the illustrated embodiment, a coordinate system 902, defining world coordinates with respect to a scene or an environment, is used to designate the positioning of the elements within the skeleton of the object 200. Thus, the position 210a of the element 206 is defined using the world coordinate system. Every time that a parent, such as the element 204a, of the element 206 is moved, the world coordinates of the element 206a must be recalculated. Similarly, any time any node is moved, the coordinates of every child of that node must be recalculated.

Figure 10:
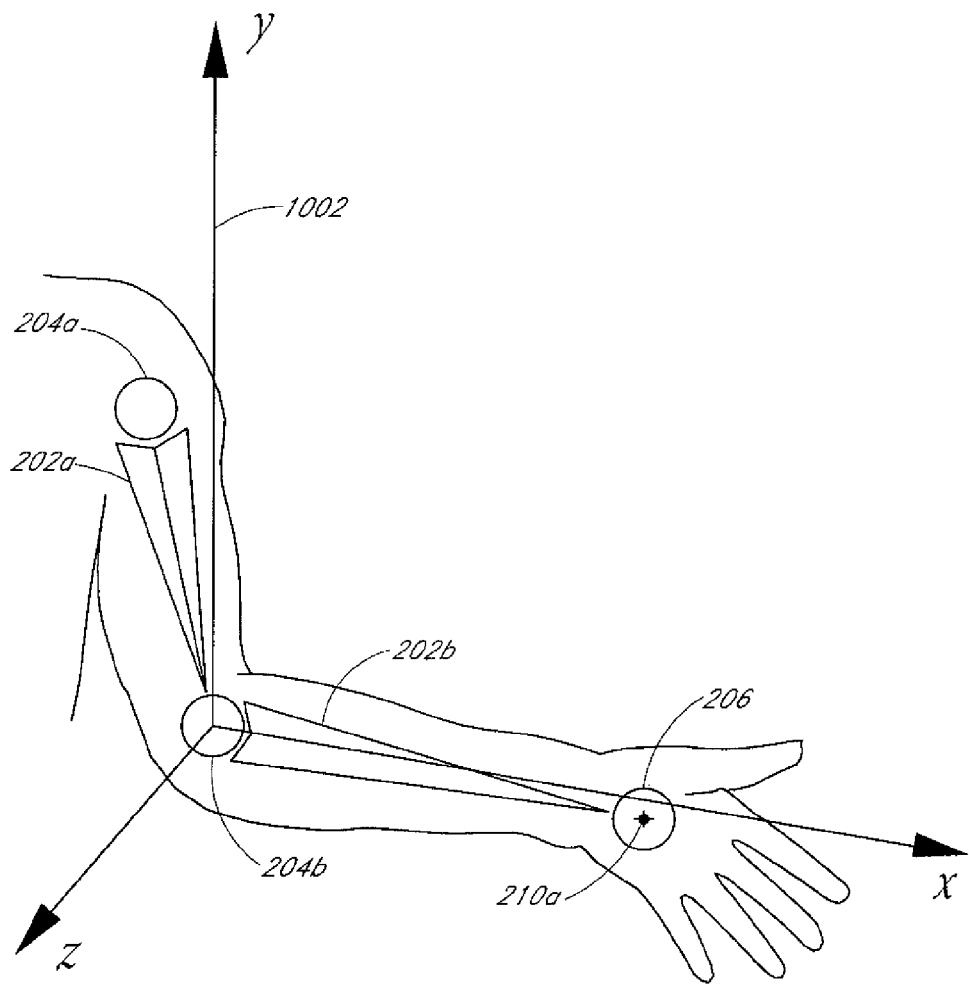
FIG. 10 is a diagram illustrating an example of the element from FIG. 9 having a position determined in a local coordinate space.

A subnetwork may be associated with its own local coordinate system. FIG. 10 is a diagram illustrating an example of the element 206 having a position determined in a local coordinate space. In the illustrated embodiment, a coordinate system 1002 defines local coordinates having their origin at the element 204b. The position 210a of the element 206 can be calculated in this local coordinate system. In this way, the local coordinates of the element 206 may not change when the element 204a and/or the element 202a move. Evaluation of the dependency graph in this situation will not require recalculation of the local coordinates of the element 206, reducing the computational complexity and time required to evaluate the dependency graph.

The local coordinates may be defined with respect to the parent of an element, or to with respect to any other element in the subnetwork of a given node. As that the subnetwork can be evaluated substantially independently of other subnetworks, the local coordinates of the subnetwork need not be updated as recently as the world coordinates would need to be. When the local coordinates of a node in the subnetwork are updated, generally only the local coordinates of elements in the subnetwork will need to be updated, not the coordinates of any other elements in the dependency graph. The world coordinates may be calculated by a central process or definition and may be calculated by the game engine described in reference to FIG. 1, and often will only need to be calculated when an element is interacting with an element of another object.

Those skilled in the art will appreciate that the example method 800 described above with reference to FIG. 8, and the subnetworks defined therein, can be used to increase the efficiency of evaluating a dependency graph. Thus, faster animation can be achieved and the game system will not be as taxed when providing data for displaying that animation.

Greater Accuracy of Animation

As described above, animation data is often omitted when being exported after being baked. Thus, minute details in the motion of an element may be lost. For example, an oscillating motion may be reduced to a substantially straight motion when data is compressed or omitted. In this way, the motion as created at the source will not be accurately recreated on a display in communication with a game system, for example the display device 116. Even when data is not lost, data provided for animation by the game system will be based on derived values of element orientations instead of based on source data, and thus may not accurately reflect the motion created at the source.

Animating an object or portion thereof by evaluating a dependency graph at the game system, however, will reproduce the motion as originally created at the source. Thus, the motion as displayed to a user of the game system will retain the minute details in the motion of the object and will retain the artistry imbued by the animator. This is particularly important for reproducing human motions, which may appear stiff or inaccurate when animated solely by a machine. An animator, however, can craft a character's movements to appear lifelike, and these movements can be reproduced by the game system without loss of motion.

To add to the improved accuracy described above, interactions of elements within a scene can be improved using a plurality of dependency graphs. When baked values are utilized, collisions must be detected between elements of separate objects. Such collisions are costly to detect and are not entirely accurate. When dependency graphs are evaluated, however, the interactions can be determined more easily and with greater detail.

Figure 11:
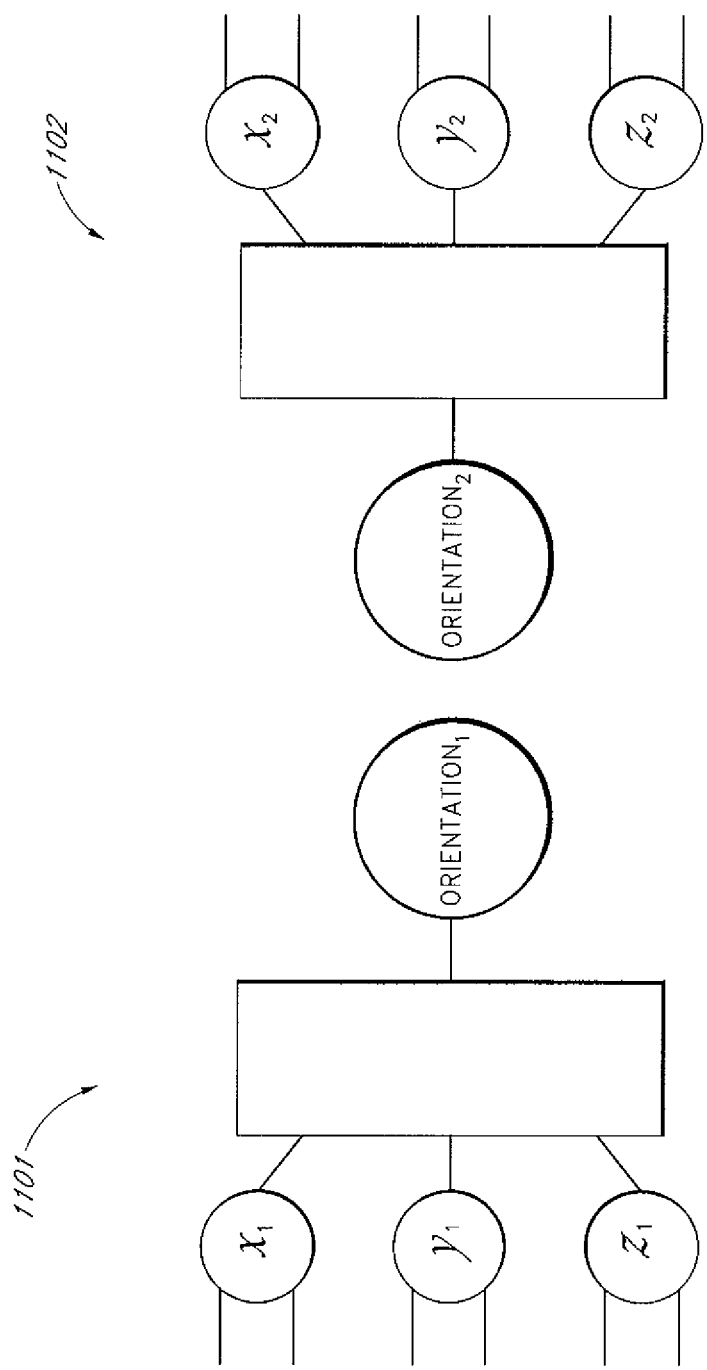
FIG. 11 is a block diagram illustrating an example of portions of two dependency graphs that may interact.

FIG. 11 is a block diagram illustrating an example of portions of two dependency graphs that may interact. Dependency graph 1101 may describe a first element of a first object having an orientation$_1$, as defined by coordinates $x_1$, $y_1$, and $z_1$. Similarly, dependency graph 1102 may describe a second element of a second object having an orientation$_2$, as defined by coordinates $x_2$, $y_2$, and $z_2$.

Figure 12:
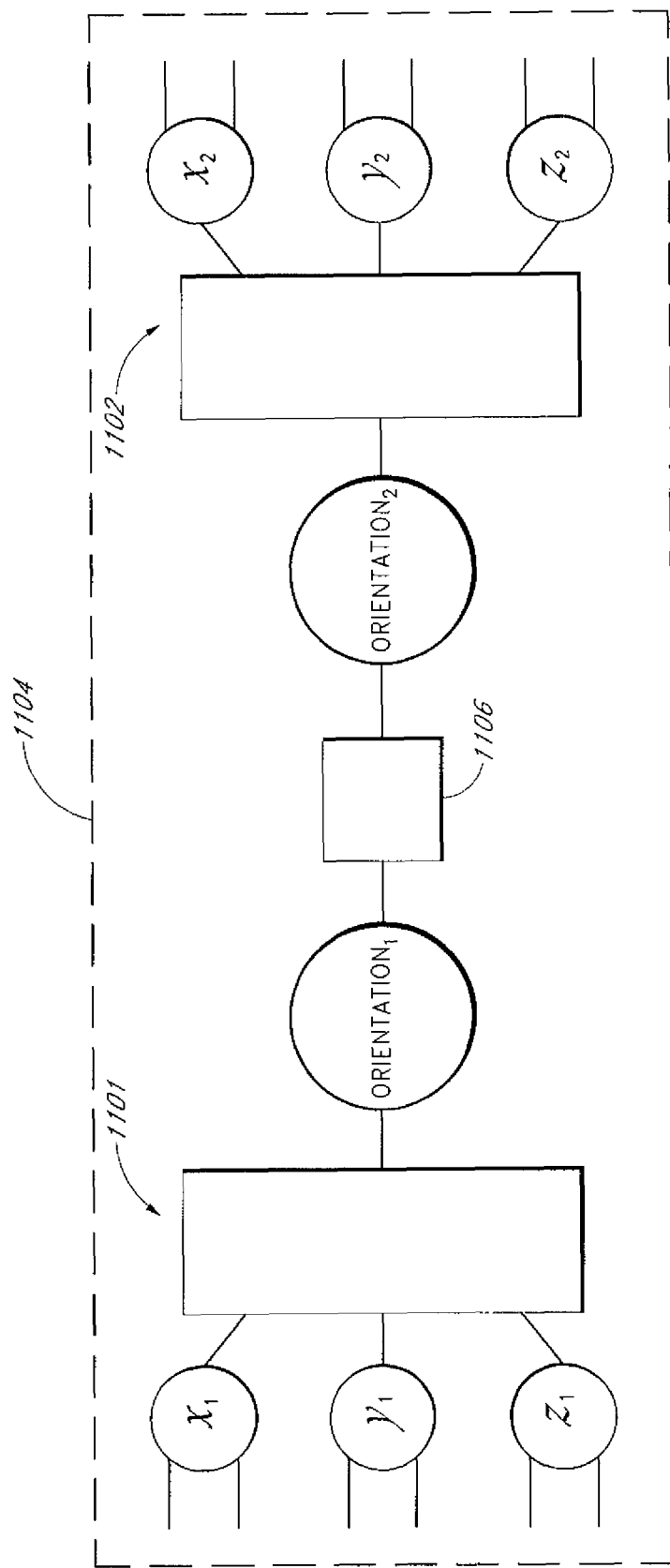
FIG. 12 is block diagram illustrating an example of the portions of the two dependency graphs from FIG. 11 grouped into a meta network.

When the two elements interact, they may be grouped into a meta network 1104, and a functional node 1106 defined between the two of them, as illustrated in FIG. 12. The game engine described in reference to FIG. 1 may be used to identify such grouping and/or define such functional node. The meta network can be evaluated similar to the evaluation of any other dependency graph or subnetwork. For example, counters representative of whether a value of either orientation$_1$ or orientation$_2$ has been updated can be implemented. The interaction of the two elements will be much more accurate and genuine because a movement in one element may be used to determine a movement in the other element. In addition, costly collision detection can be avoided.

As an example, orientation$_1$ may describe a hand of a first character. Orientation$_2$ may describe the hand of a second character. During execution of the game, the two characters may shake hands. Instead of each character executing a predefined animation independent of the other character, one character can execute a handshake defined by an animation curve, and the other character can react appropriately, As another example, orientation$_1$ may again describe the first character's hand, while orientation$_2$ may describe a door. When the door is shut, the functional node 1106 can be defined to prevent the character's hand from moving the door or from passing through the door. If the character's hand is making contact with a doorknob, for example, the functional node 1106 can be defined to allow the character's hand to turn the doorknob.

Those skilled in the art will appreciate that the examples described above and the meta-network described in reference to FIGS. 11 and 12 can be used to increase the accuracy of animation by a game system. The number of costly operations used in animation can be reduced or avoided, and the resulting animation may be more accurate and natural.

More Adaptable Animation

Not all interactions or events in a game can be predefined. The outcome of the game and the events leading up to that outcome are determined by input from a user. These inputs can be unpredictable, and may vary depending on the situation. The number of such inputs and possible configurations of objects during execution of the game is infinite. Thus, much animation must be determined during execution of the game, rather than being predetermined at a source.

Figure 13:
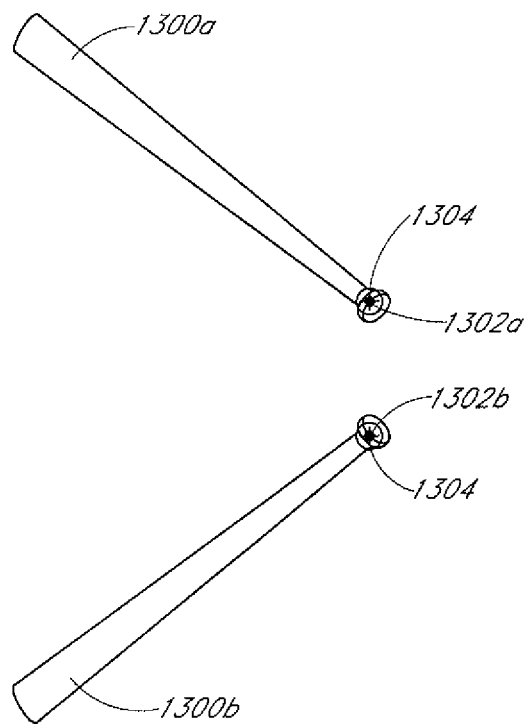
FIG. 13 is a diagram of an example of an object placed at different positions by two different animation curves.

FIG. 13 is a diagram of an example of an object 1300 placed at different positions by two different animation curves. In FIG. 13, the object 1300 is illustrated as being a bat. As an example, a character may be swinging the bat. When a first animation curve is followed to swing the bat high, a control element 1304 is positioned at point 1302*a* such that the bat 1300*a* points upward as shown. When a second animation curve is followed to swing the bat low, the control element 1304 is positioned at point 1302*b* such that the bat 1300*b* points downward as shown.

Figure 14:
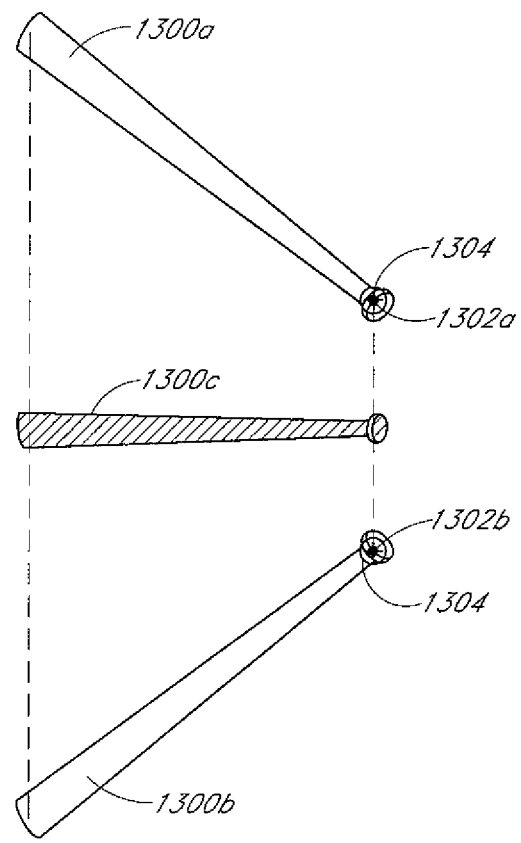
FIG. 14 is a diagram of the object at different positions from FIG. 13 with an example of the object at an intermediate position determined by averaging the different positions.

When animations are baked, a configuration that has not been defined must be created by blending two existing configurations. Thus, if the character were to swing the bat in the middle of the high swing animation curve and the low swing animation curve, the animation of the bat 1300*a* and the animation of the bat 1300*b* would have to be combined to produce a bat positioned between the two. Methods of combining baked animations to produce this result may simply create an object that is an average of the object 1300 at the two positions 1302*a* and 1302*b*. Thus, the bat 1300*c* will be animated as a spatial averaging of the bat 1300*a* and the bat 1300*b*, as illustrated in FIG. 14. Such averaging, however, may lead to inaccurate animation or create artifacts during motion of the averaged animation. As can be seen in FIG. 14, the bat 1300*c* is shorter than either the bat 1300*a* or 1300*c*.

More accurate animations can be created by combining animation curves for a control element. Thus, instead of spatially averaging two images of an object, the animation curves for those images can be averaged, and the object can be illustrated with the combined animation curve. Illustrating a previously undefined motion in this way may reduce artifacts and improve the aesthetic quality of the resulting animation. For example, a first animation curve may be defined to animate a character walking on level ground, and a second animation curve may be defined to animate a character walking up a steep hill. The character may be animated as walking up a moderate hill by combining the first and second animation curves.

Figure 15:
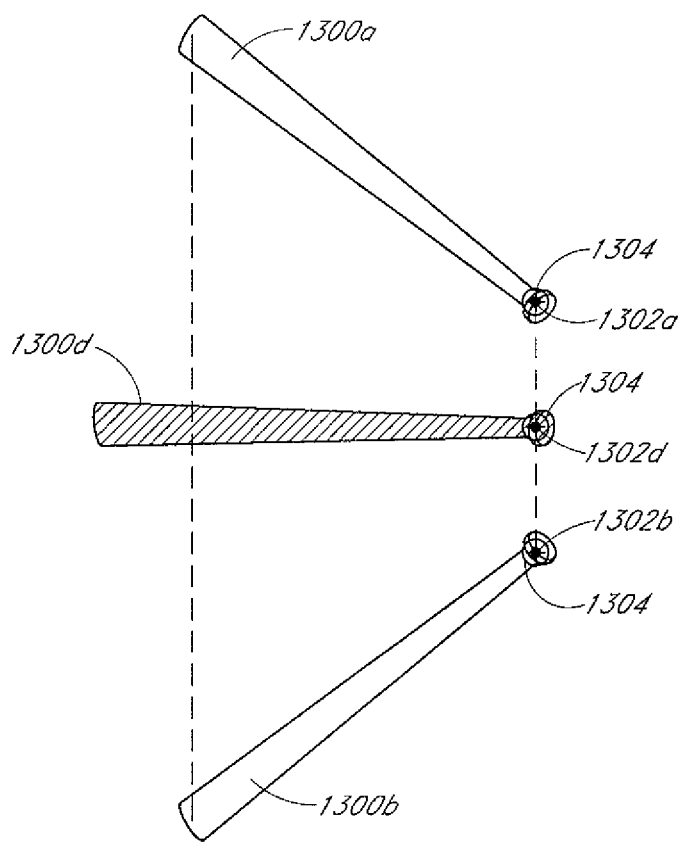
FIG. 15 is a diagram of the object at different positions from FIG. 13 with an example of the object at an intermediate position determined by averaging the different animation curves.

FIG. 15 is another diagram of the object 1300 at the positions 1302*a* and 1302*b* from FIG. 13. In FIG. 15, however, a bat 1300*d* is animated using the control element 1304 positioned at point 1302*d*. The position 1302 may be determined by averaging the positions and orientations of the control element 1304 at the points 1302*a* and 1302*b*. As can be seen in FIG. 15, the resulting bat 1300*d* may be more accurate. In addition, a motion animated using the average of two animation curves may be more natural or believable to a user.

In addition, a dependency graph of a control element can be evaluated when animating elements using the control element and combined animation curves. By evaluating the dependency graph, other elements represented in the dependency graph may be appropriately illustrated and a consistent interaction of elements may be maintained. For example, a character's arm following a first animation curve may be positioned at the front of the character's body, while the same arm following a second animation curve may be positioned at the back of the character's body. When averaged together, the arm may appear to pass through the character's body. Such inconsistent animation often cannot be prevented in a game system using baked animations, even when using an averaging method, such as spherical linear interpolation, designed for use with animations. Constraints defined in a dependency graph for the arm and body, however, may prevent the arm from intersecting the body or may cause the body to move out of the way when determining a position of the arm using a control point and the dependency graph.

Animation curves can be combined in any number of ways. In some embodiments, the animation curves are averaged. In other embodiments, a weighted average of the animation curves is determined. The weighted average may be determined by the animator at the source, or may be dependent on factors in the game. In the example of a character walking up a moderate hill discussed above, for example, the character may be animated using a weighted average of the first and second animation curves, where the weighted average is determined by the steepness of the moderate hill as compared to the level ground or the steep hill. The weighted average may be constant, or it may be adjusted over time. For example, the game engine may determine a variability of the relative weighting of each dependency graph or a predetermined function, which may be created or designed by the animator, may be used to vary the weighting over time.

Evaluating a dependency graph in a game system also will increase the ease with which inverse kinematics can be performed during execution of the game. Inverse kinematics refers to determining the positions and orientations of elements based on a desired final position and orientation. Instead of receiving adjustments to each element, as would a forward kinematics solver, an inverse kinematics solver receives procedural input and must determine the adjustments that satisfy that procedural input.

For example, when a dependency graph is evaluated as described in reference to FIG. 4, the position and orientation of an element is determined using an animation curve for each time $t_g$. An inverse kinematics solver, however, will not be given the animation curve, but must determine each position and orientation in the absence of the animation curve or must uniquely define an animation curve. For example, a user of the game system may input instructions to cause a character to pick up an item such as a piece of food off of a table. An inverse kinematics solver may receive a final position of the character's hand, which is equivalent to the position of the item of food, and may thereafter determine the positions, orientations, and movements of the hand and connected elements that will cause the hand to reach to that final position.

To ensure that inverse kinematic solutions are aesthetically pleasing when animated by the game system, the animator may determine or create an inverse kinematics rig and dependency graph at the source. The inverse kinematics dependency graph can be used by the game system to determine inverse kinematics solutions based on procedural inputs. Thus, even when a situation is encountered which is not associated with a predefined animation curve, the animator's original artistry can be used to animate the events in the situation.

The inverse kinematics dependency graph may be defined in relation to the dependency graph exported at block 506 of the example method 500. In this embodiment, the dependency graph that is used to animate an object or portion thereof with an animation curve may be reconfigured for use in solving inverse kinematics problems. For example, the value nodes 408x, 408y, and 408z in the portion of the dependency graph 400, representing an animation curve in the x, y, and z planes, respectively, may be replaced with nodes that hold values representing the desired next coordinates of an element represented by the portion of the dependency graph 400. The functional nodes 410x, 410y, and 410z may similarly be replaced with node that hold functions that determine angles or orientations producing such desired coordinates of the element. Those skilled in the art will recognize other ways in which dependency graphs, or the portion of the dependency graph 400 in particular, can be reconfigured for use with inverse kinematics.

The inverse kinematics dependency graph may also be defined as an entirely separate dependency graph. The animator may create this dependency graph at the source, and a description of this dependency graph may be exported at block 506 of the method 500, and loaded on the game system at block 508, in addition the dependency graph and animation curve data previously described as being exported and loaded. The inverse kinematics dependency graph may be evaluated during execution of the game at an interactive rate.

A game engine, such as the game engine described in reference to FIG. 1, may identify an event indicating that inverse kinematics should be used. This event may cause a dependency graph to be reconfigured, or may cause a separate dependency graph to be used. For example, when a user inputs commands to cause a character to pick up an item, as described above, the engine may switch to an inverse kinematics dependency graph to determine the movements of the character's hand and connected elements that will cause the hand to reach to the position of the item. In some embodiments, two dependency graphs are used to animate inverse kinematics to ensure that the determined inverse kinematic solution is smooth. For example, motions determined using a first inverse kinematics graph may be blended with motions determined using a second inverse kinematics graph. The blend may be determined using an average of the two dependency graphs, a constant weighted average of the two dependency graphs, or a weighted average of the two dependency graphs that varies or shifts over time.

Evaluating an inverse kinematics dependency graph at the game system provides many advantages. For example, a dependency graph created by an animator at the source may be used instead of requiring the game system to determine an inverse kinematics algorithm. Such inverse kinematics solution defined by the game system may not retain the animator's artistry and may be taxing on the game system. In addition, the inverse kinematics solution may be more accurate using an inverse kinematics dependency graph, and may involve a greater number of elements, thereby making the resulting animation more believable to a user. For example, if a character is picking an item up off the floor of the scene, a game-defined inverse kinematics solution may animate the character as reaching down or bending rigidly at the waist. Using an inverse kinematics dependency graph, the character can be animated as crouching and picking up the item in a more lifelike manner.

Those skilled in the art will appreciate that the examples described above including the animation curve blending described in reference to FIG. 13-15 and the inverse kinematics dependency graph can be used to increase the adaptability of animations generated by a game system. Situations which have not been expressly animated by an animator can be animated using the game system in a consistent and simple manner.

Those skilled in the art will appreciate that the example system, devices, methods, and embodiments described above can be used to evaluate a source dependency graph and animation curve with a game system. The dependency graph may be evaluated at an interactive rate during execution of a game by the game system. Evaluation of the dependency graph may provide data for animating an object or portion thereof, for example on a display device in communication with the game system. A description of the dependency graph may reduce the amount of data required to be transferred to the game system. Identifying subnetworks of the dependency graph may increase the efficiency with which the dependency graph may be evaluated. The dependency graph may be evaluated by a plurality of processors in parallel. Functions can be defined to relate two dependency graphs, and animation curves of a dependency graph can be combined. A switching event may cause the game system to use an inverse kinematics dependency graph. The game system may thereby produce animations quicker, using fewer resources, with greater accuracy, and in a greater variety of situations.

Those skilled in the art will realize that although certain of the examples and embodiments described herein relate to a change in a position or orientation of an element, the descriptions herein can equally be applied to any change in state defined, represented, or identified by a control element and/or an animation curve. For example, the change in state may represent a modified path of travel, orientation, position, color, shape, shading, or texture, or may even represent a trigger for a selected action or a plurality of selected actions.

Those skilled in the art will recognize that described systems, devices, components, methods, or algorithms may be implemented using a variety of configurations or steps. No single example described above constitutes a limiting configuration or number of steps. For example, configurations of the game system 100 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

While the above detailed description has shown, described, and pointed out novel features as applied to various aspects, it will be understood that various omissions, substitutions, and changes in the form and details of the system, devices, or methods illustrated may be made by those skilled in the art without departing from the scope of this disclosure. As will be recognized, the aspects and variations of the aspects may be embodied within a form that does not provide all of the features and benefits set forth herein, as some features may be used or practiced separately from others. The scope of this disclosure is defined by the appended claims, the foregoing description, or both.

What is claimed is:

1. A game animation system, comprising:
one or more processors configured to execute a game, wherein the game includes one or more objects, and wherein an object includes one or more control elements and one or more elements;
non-transitive electronic storage storing:
source animation curve data, the source animation curve data representing an animation curve of an object, wherein the source animation curve data describes change in a state of a control element over time, wherein a change in the state of the control element affects a position and/or orientation of elements of the object, where the elements of the object are different simulated physical portions of the object;
secondary source animation curve data, the secondary source animation curve data representing a secondary animation curve of a secondary object, the secondary object being separate, discrete, and unconnected to the object in the game, wherein the secondary animation curve data describes change in a secondary state of a secondary control element over time;
a description of a first dependency graph defining transforms for the source animation curve data, wherein the first dependency graph includes nodes representing hierarchically interrelated elements of the object; and
a secondary description of a secondary dependency graph defining transforms for the secondary source animation curve data, wherein the secondary dependency graph includes nodes representing interrelated elements of the secondary object;
wherein the one or more processors are further configured to execute a game engine configured to evaluate an interaction of the object related to the first dependency graph and the secondary object related to the secondary dependency graph to simulate a releasable engagement between the object and the secondary object in the game, where evaluation of the interaction is based on grouping a first element of the object and a second element of the secondary object into a meta network, wherein the meta network includes a functional node that is connected to the first element and the second element during the simulated releasable engagement.

2. The game animation system of claim 1, wherein the nodes included in the first dependency graph describe a state of the elements of the object that are displayed during execution of the game based on the state of the control element.

3. The game animation system of claim 1, wherein the first dependency graph comprises information for transforming the source animation curve data into data usable by at least one of a rendering system, game save system, physics system, and a special effects system.

4. The game animation system of claim 1, wherein the change in the state of the control element comprises movement of a predetermined point along a previously defined path.

5. The game animation system of claim 1, wherein the game engine is configured to generate data representing an orientation of a first element in relation to a third element, the first element and the third element defining the structure of at least a portion of the object.

6. The game animation system of claim 1, wherein the one or more processors are further configured to execute a graphics processor configured to generate data for display, the data for display describing at least a portion of the first object and the second object included in the meta network.

7. The game animation system of claim 6, further comprising a display device in communication with an output of the graphics processor.

8. The game animation system of claim 1, wherein the description of the first dependency graph is reconfigurable based at least partially on procedural input received during execution of the game.

9. The game animation system of claim 1, wherein the electronic storage further stores a description of a second dependency graph, wherein said game engine is further configured to provide data for animating at least a portion of the first object based on said second dependency graph subsequent to a switching event detected during execution of the game.

10. The game animation system of claim 1, wherein the game engine is configured to evaluate the first dependency graph based on a combination of two or more source animation curves.

11. The game animation system of claim 1, wherein the description of the first dependency graph comprises a plurality of counters describing a number of times that a plurality of nodes have been updated.

12. The game animation system of claim 1, wherein the one or more processors comprise a plurality of processors for executing the game.

13. The game animation system of claim 1, wherein the description of the first dependency graph comprises a first data structure storing a first node of the first dependency graph, the first node representing a first spatial or temporal value of one of the elements of the object related to the first dependency graph, and wherein the description of the first dependency graph further comprises a second data structure storing a second node of the dependency graph, the second node representing a relationship between the first temporal or spatial value and a second temporal or spatial value of one of the elements of the object related to the first dependency graph, wherein the second data structure is distinct from the first data structure.

14. The game animation system of claim 1, wherein the meta network comprises a first subnetwork associated with the object related to the first dependency graph and a second subnetwork associated with the secondary object, wherein the one or more processors comprise a plurality of processors, and wherein the game engine is configured such that the first subnetwork and the second subnetwork are evaluated by distinct processors.

15. The game animation system of claim 14, wherein each node in at least one of the plurality of subnetworks comprises a counter indicative of the number of times that the data in that node has been updated.

16. The game animation system of claim 14, wherein a position of at least one element in one of the subnetworks is defined in a coordinate space of the subnetwork.

17. The game animation system of claim 16, wherein the one or more processors are further configured to execute an animation engine configured to convert the position of the at least one element from the coordinate space of the subnetwork to a world coordinate space.

18. A computer-implemented method of executing a game including one or more objects on a game animation system, wherein an object is associated with one or more control elements and one or more elements, the method comprising:
    identifying source animation curve data, the source animation curve data representing an animation curve of an object, wherein the source animation curve data describes change in a state of a control element over time, wherein a change in a state of a control element affects a position and/or orientation of elements of the object in the game, where the elements of the object are different simulated physical portions of the object;
    identifying secondary source animation curve data, the secondary source animation curve data representing a secondary animation curve of a secondary object, the secondary object being separate, discrete, and unconnected to the object in the game, wherein the secondary animation curve data describes change in a secondary state of a secondary control element over time;
    identifying a description of a first dependency graph, the dependency graph defining transforms for the source animation curve data, wherein the first dependency graph includes nodes representing hierarchically interrelated elements of the object;
    identifying a secondary description of a secondary dependency graph, the secondary dependency graph defining transforms for the secondary source animation curve data, wherein the secondary dependency graph includes nodes representing interrelated elements of the secondary object; and
    evaluating an interaction of the object related to the first dependency graph and the secondary object related to the secondary dependency graph at an interactive rate while executing the game to simulate a releasable engagement between the object and the secondary object in the game, where evaluating the interaction includes grouping a first element of the object and a second element of the secondary object into a meta network during the simulated releasable engagement, wherein the meta network includes a functional node that is connected to the first element and the second element.

19. The method of claim 18, further comprising displaying the object related to the first dependency graph and the secondary object based on a current state of the control element and/or the secondary control element.

20. The method of claim 19, wherein the displaying the object comprises animating a mesh or skin over a plurality of plurality of elements described by the plurality of nodes.

21. The method of claim 19, further comprising updating a counter in at least one of the plurality of nodes.

22. The method of claim 19, further comprising determining that a counter in one of the plurality of nodes is unequal to a counter in a parent of the one of the plurality of nodes, and requesting that the one of the plurality of nodes be updated.

23. The method of claim 18, wherein evaluating the interaction comprises transforming the source animation curve data into data usable by at least one of a rendering system, game save system, physics system, and a special effects system.

24. The method of claim 18, comprising providing data representing movement of a predetermined point along a previously defined path.

25. The method of claim 18, comprising generating data representing an orientation of the first element in relation to a third element, the third element defining the structure of at least a portion of the object related to the first dependency graph.

26. The method of claim 18, further comprising reconfiguring the description of the first dependency graph such that the reconfigured first dependency graph can be used to determine the position of at least one element for display based at least in part on procedural input received during execution of the game.

27. The method of claim 18, further comprising:
   animating at least a portion of the object related to the first dependency graph based at least in part on data derived from evaluating the description of the first dependency graph;
   identifying a switching event subsequent to the evaluating the first dependency graph; and
   animating at least a portion of the object related to the first dependency graph based at least in part on data derived from evaluating a description of a second dependency graph, the evaluating the description of the second dependency graph being responsive to the identifying a switching event.

28. The method of claim 18, further comprising combining two source animation curves, and wherein the evaluating the first dependency graph is based on the combined source animation curves.

29. The method of claim 18, further comprising identifying a relationship between the first dependency graph and a second dependency graph evaluated while executing the game.

30. The method of claim 18, further comprising:
   storing a first data structure containing at least a first node, the first node being one of the plurality of nodes and representing a first spatial or temporal value of one of the elements of the object related to the first dependency graph; and
   storing a second data structure containing at least a second node, the second node being one of the plurality of nodes and representing a relationship between the first temporal or spatial value and a second temporal or spatial value of one of the elements of the object related to the first dependency graph,
   wherein the second data structure is distinct from the first data structure.

31. The method of claim 18, wherein the meta network comprises a first subnetwork associated with the object related to the first dependency graph and a second subnetwork associated with the secondary object, wherein the evaluating is performed by a plurality of processors such that the first subnetwork and the second subnetwork are evaluated by distinct processors.

32. The method of claim 31, comprising updating a spatial value in a node of one of the plurality of subnetworks, and thereafter increasing a counter in that node.

33. The method of claim 31, further comprising determining that a counter in one of the plurality of nodes in a subnetwork is unequal to a counter in another node in the subnetwork, and requesting that the one of the plurality of nodes be updated.

34. The method of claim 31, further comprising displaying the first object on a display device.

35. The method of claim 31, further comprising defining a position of at least one element in one of the subnetworks in a coordinate space of the subnetwork.

36. The method of claim 35, further comprising converting the position of the at least one element from the coordinate space of the subnetwork to a world coordinate space.

* * * * *